(12) United States Patent
Chen et al.

(10) Patent No.: US 9,966,096 B2
(45) Date of Patent: May 8, 2018

(54) SELF-ASSEMBLED NANOPARTICLES WITH POLYMERIC AND/OR OLIGOMERIC LIGANDS

(71) Applicant: Western Digital Technologies, Inc., Irvine, CA (US)

(72) Inventors: Jun Chen, Union City, CA (US); Nicholas R. Conley, Redwood City, CA (US); Bruce A. Gurney, San Jose, CA (US); Ricardo Ruiz, Santa Clara, CA (US); Lei Wan, San Jose, CA (US); Qing Zhu, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 399 days.

(21) Appl. No.: 14/547,098

(22) Filed: Nov. 18, 2014

(65) Prior Publication Data
US 2016/0140991 A1     May 19, 2016

(51) Int. Cl.
*G11B 5/66* (2006.01)
*G11B 5/855* (2006.01)
(Continued)

(52) U.S. Cl.
CPC ........... *G11B 5/855* (2013.01); *B05D 1/00* (2013.01); *G11B 5/712* (2013.01); *G11B 5/746* (2013.01);
(Continued)

(58) Field of Classification Search
CPC ....... G11B 5/712; G11B 5/855; G11B 5/8404; G11B 5/743; G11B 5/746; G11B 5/72;
(Continued)

(56) References Cited

U.S. PATENT DOCUMENTS

| 5,658,659 A | 8/1997 | Chen et al. |
| 5,800,931 A | 9/1998 | Lee et al. |

(Continued)

FOREIGN PATENT DOCUMENTS

| EP | 2701183 A1 | 2/2014 |
| JP | 2007299491 A | 11/2007 |

(Continued)

OTHER PUBLICATIONS

English abstract of JP 2014-160530, Japan, Sep. 4, 2014.*

(Continued)

*Primary Examiner* — Holly Rickman
(74) *Attorney, Agent, or Firm* — Foley & Lardner LLP

(57) ABSTRACT

In one embodiment, a structure includes: a substrate; and a monolayer of nanoparticles positioned above the substrate, where the nanoparticles are each grafted to one or more oligomers and/or polymers, and where each of the polymers and/or oligomers includes at least a first functional group configured to bind to the nanoparticles. In another embodiment, a structure includes: a substrate; a structured layer positioned above the substrate, the structured layer comprising a plurality of nucleation regions and a plurality of non-nucleation regions; and a crystalline layer positioned above the structured layer, where the plurality of nucleation regions have a pitch in a range between about 5 nm to about 20 nm.

25 Claims, 20 Drawing Sheets

(51) Int. Cl.
*G11B 5/74* (2006.01)
*G11B 5/712* (2006.01)
*B05D 1/00* (2006.01)
*B82Y 10/00* (2011.01)
*B82B 1/00* (2006.01)
*B82Y 30/00* (2011.01)

(52) U.S. Cl.
CPC ............... *B82B 1/00* (2013.01); *B82Y 10/00* (2013.01); *B82Y 30/00* (2013.01)

(58) Field of Classification Search
CPC ......... G11B 5/725; B82Y 30/00; B82Y 10/00; B05D 1/00
USPC ............. 360/75; 428/839.2, 840, 840.1, 746, 428/832.1, 832; 216/37; 427/180
See application file for complete search history.

(56) References Cited

U.S. PATENT DOCUMENTS

| | | | |
|---|---|---|---|
| 5,846,648 | A | 12/1998 | Chen et al. |
| 6,132,863 | A | 10/2000 | Song et al. |
| 6,180,202 | B1 | 1/2001 | Lee |
| 6,472,047 | B1 | 10/2002 | Kirino et al. |
| 6,620,531 | B1 | 9/2003 | Cheng |
| 7,976,715 | B2 | 7/2011 | Dobisz et al. |
| 8,048,546 | B2 | 11/2011 | Albrecht et al. |
| 8,119,017 | B2 | 2/2012 | Albrecht et al. |
| 8,491,800 | B1* | 7/2013 | Dorsey .............. G11B 5/746 216/22 |
| 8,512,417 | B2 | 8/2013 | Miller et al. |
| 8,625,233 | B1 | 1/2014 | Ji et al. |
| 8,691,365 | B2 | 4/2014 | Maliakal |
| 9,062,144 | B2 | 6/2015 | Wang et al. |
| 9,224,412 | B2* | 12/2015 | Gurney .............. G11B 5/7325 |
| 9,224,413 | B2 | 12/2015 | Kimura et al. |
| 2002/0136927 | A1 | 9/2002 | Hieda et al. |
| 2004/0071924 | A1 | 4/2004 | Yang et al. |
| 2005/0105038 | A1 | 5/2005 | Kondo et al. |
| 2006/0099430 | A1 | 5/2006 | Subramanya et al. |
| 2006/0269794 | A1 | 11/2006 | Oikawa |
| 2007/0224455 | A1 | 9/2007 | Lida et al. |
| 2007/0231608 | A1 | 10/2007 | Mukai |
| 2007/0292486 | A1 | 12/2007 | Sen et al. |
| 2008/0050616 | A1 | 2/2008 | Lee et al. |
| 2009/0053512 | A1 | 2/2009 | Pyun et al. |
| 2009/0059430 | A1 | 3/2009 | Dobisz et al. |
| 2009/0062197 | A1 | 3/2009 | Wolf et al. |
| 2009/0090463 | A1 | 4/2009 | Kawamura |
| 2009/0196488 | A1 | 8/2009 | Nealey et al. |
| 2010/0143665 | A1 | 6/2010 | Ogawa |
| 2010/0303874 | A1 | 12/2010 | Akcora et al. |
| 2010/0311613 | A1 | 12/2010 | Busnaina et al. |
| 2012/0082866 | A1 | 4/2012 | Xiao et al. |
| 2013/0099213 | A1 | 4/2013 | Jun et al. |
| 2013/0170075 | A1 | 7/2013 | Dai et al. |
| 2014/0138352 | A1 | 5/2014 | Lille et al. |
| 2014/0231383 | A1* | 8/2014 | Gurney .............. G11B 5/855 216/22 |
| 2014/0234665 | A1 | 8/2014 | Gurney et al. |
| 2015/0248909 | A1 | 9/2015 | Gurney et al. |
| 2015/0322277 | A1 | 11/2015 | Spatz et al. |
| 2016/0140994 | A1 | 5/2016 | Chen et al. |

FOREIGN PATENT DOCUMENTS

| | | |
|---|---|---|
| WO | 2008156510 A2 | 12/2008 |
| WO | 2009035411 A1 | 3/2009 |
| WO | 2012170643 A1 | 12/2012 |

OTHER PUBLICATIONS

English abstract of JP 2014-160531, Japan, Sep. 4, 2014.*
Notice of Allowance from U.S. Appl. No. 14/194,505, dated Aug. 19, 2016.
Final Office Action from U.S. Appl. No. 14/547,093, dated Oct. 7, 2016.
Final Office Action from U.S. Appl. No. 14/194,505, dated Nov. 16, 2015.
Non-Final Office Action from U.S. Appl. No. 14/547,093, dated Feb. 24, 2016.
Combined Search and Examination Report from United Kingdom Application No. GB1502821.0, dated Jul. 21, 2015.
Advisory Action from U.S. Appl. No. 14/194,505, dated Feb. 5, 2016.
Non-Final Office Action from U.S. Appl. No. 14/194,505, dated Mar. 15, 2016.
Non-Final Office Action from U.S. Appl. No. 14/194,505, dated May 11, 2015.
Chen et al., U.S. Appl. No. 14/547,093, filed Nov. 18, 2014.
Asbahi et al., "Directed Self-Assembly of Densely Packed Gold Nanoparticles," ACS Publications, Langmuir, vol. 28, 2012, pp. 16782-16787.
Black et al., "Polymer self assembly in semiconductor microelectronics," IBM Journal of Research and Development, vol. 51, No. 5, Sep. 2007, pp. 605-633.
Dong et al., "Binary nanocrystal superlattice membranes self-assembled at the liquid-air interface," Nature, vol. 466, Jul. 22, 2010, pp. 474-477.
Fischer et al., "Completely Miscible Nanocomposites," Angewandte Chemie-International Edition, vol. 50, 2011, pp. 7811-7814.
Hogg et al., "Investigating Pattern Transfer in the Small-Gap Regime Using Electron-Beam Stabilized Nanoparticle Array Etch Masks," IEEE Transactions on Magnetics, vol. 46, No. 6, Jun. 2010, pp. 2307-2310.
Hogg et al., "Pattern transfer with stabilized nanoparticle etch masks," Nanotechnology, vol. 24, 2013, pp. 1-10.
Kumar et al., "Nanocomposites with Polymer Grafted Nanoparticles," ACS Publications, Macromolecules, vol. 46, 2013, pp. 3199-3214.
Murray et al., "Synthesis and Characterization of Monodisperse Nanocrystals and Close-Packed Nanocrystal Assemblies," Annual Review of Materials Science, vol. 30, 2000, pp. 545-610.
Privman, V., "Diffusional nucleation of nanocrystals and their self-assembly into uniform colloids," Journal of Optoelectronics and Advanced Materials, vol. 10, No. 11, Nov. 2008, pp. 2827-2839.
Pyun et al., "Synthesis and Characterization of Organic/Inorganic Hybrid Nanoparticles: Kinetics of Surface-Initiated Atom Transfer Radical Polymerization and Morphology of Hybrid Nanoparticle Ultrathin Films," Macromolecules, vol. 36, 2003, pp. 5094-5104.
Richter et al., "Media for Magnetic Recording Beyond 100Gbit/in.2," MRS Bulletin, vol. 31, May 2006, pp. 384-388.
Shevchenko et al., "Structural diversity in binary nanoparticle superlattices," Nature, vol. 439, Jan. 5, 2006, pp. 55-59.
Sperling et al., "Surface modification, functionalization and bioconjugation of colloidal inorganic nanoparticles," Philosophical Transactions of The Royal Society A, 2010, vol. 368, Nov. 21, 2013, pp. 1333-1383.
Sundar et al., "Novel Scheme for Producing Nanoscale Uniform Grains Based on Templated Two-Phase Growth," American Chemical Society, ACS Publications, Jan. 6, 2014, pp. A-E.
Taheri et al., "Routes to Nanoparticle-Polymer Superlattices," Polymers, vol. 3, 2011, pp. 662-673.
Talapin, D., "Nanocrystal solids: A modular approach to materials design," Materials Research Society, vol. 37, Jan. 2012, pp. 63-71.
Xiong et al., "Revealing the Interfacial Self-Assembly Pathway of Large-Scale, Highly-Ordered, Nanoparticle/Polymer Monolayer Arrays at an Air/Water Interface," ACS Publications, Nano Letters, vol. 13, 2013, pp. 1041-1046.
Xu et al., "Position transitions of polymer-grafted nanoparticles in diblock-copolymer nanocomposites," eXPRESS Polymer Letters, vol. 5, No. 4, 2011, pp. 374-383.
U.S. Appl. No. 14/194,505, filed Feb. 28, 2014.

(56) References Cited

OTHER PUBLICATIONS

Non-Final Office Action from U.S. Appl. No. 14/547,093, dated Mar. 24, 2017.

* cited by examiner

US 9,966,096 B2

SELF-ASSEMBLED NANOPARTICLES WITH POLYMERIC AND/OR OLIGOMERIC LIGANDS

FIELD OF THE INVENTION

The present invention relates to data storage systems, and more particularly this invention relates to self-assembled nanoparticles grafted to polymeric and/or oligomeric ligands, which may be especially useful for magnetic recording media applications.

BACKGROUND

Nanoparticle lithography based on colloidal self-assembly of inorganic nanoparticles has been thwarted by numerous challenges that have precluded its use as a realistic form of alternative lithography. Some of these challenges include: the tendency to form aggregates due to the strong interactions between particles; the difficulty in forming self-terminating, fully packed single monolayers; the lack of control during self-assembly which is usually limited by entropic crystallization during a fast drying step; the difficulty in removing the ligands without affecting the pattern quality; and the lack of a method to transfer the self-assembled pattern to some other materials for various applications.

Accordingly, there is a need in the art for improved structures comprising uniform monolayers of self-assembling nanoparticles, and methods of making and using the same.

SUMMARY

According to one embodiment, a structure includes: a substrate; and a monolayer of nanoparticles positioned above the substrate, where the nanoparticles are each grafted to one or more oligomers and/or polymers, and where each of the polymers and/or oligomers includes at least a first functional group configured to bind to the nanoparticles.

According to another embodiment, a structure includes: a substrate; a structured layer positioned above the substrate, the structured layer comprising a plurality of nucleation regions and a plurality of non-nucleation regions; and a crystalline layer positioned above the structured layer, where the plurality of nucleation regions have a pitch in a range between about 5 nm to about 20 nm.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

Figure 1:
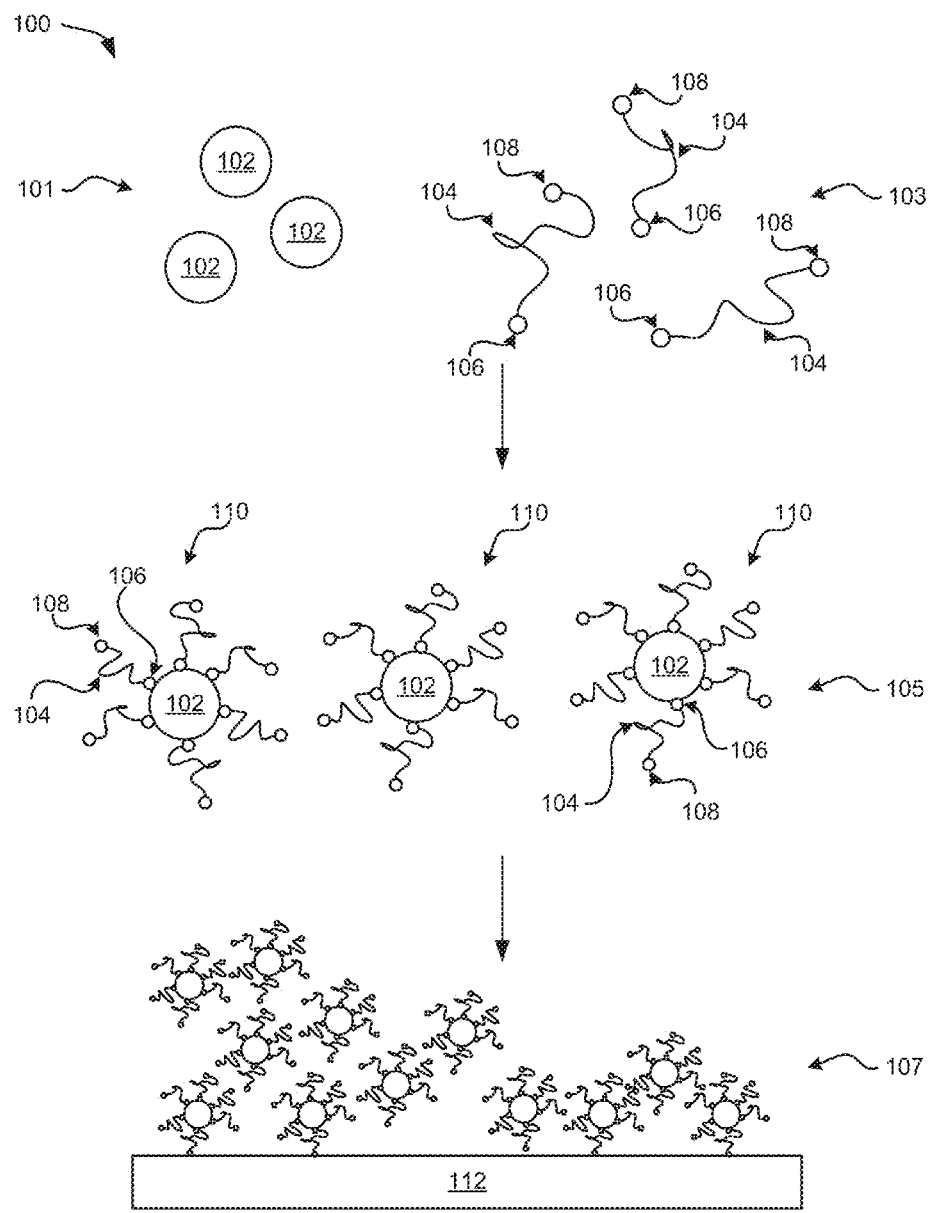
FIG. 1 is a flowchart of a method for forming a self-terminating monolayer of self-assembling nanoparticles, according to one embodiment.
Figure 1:
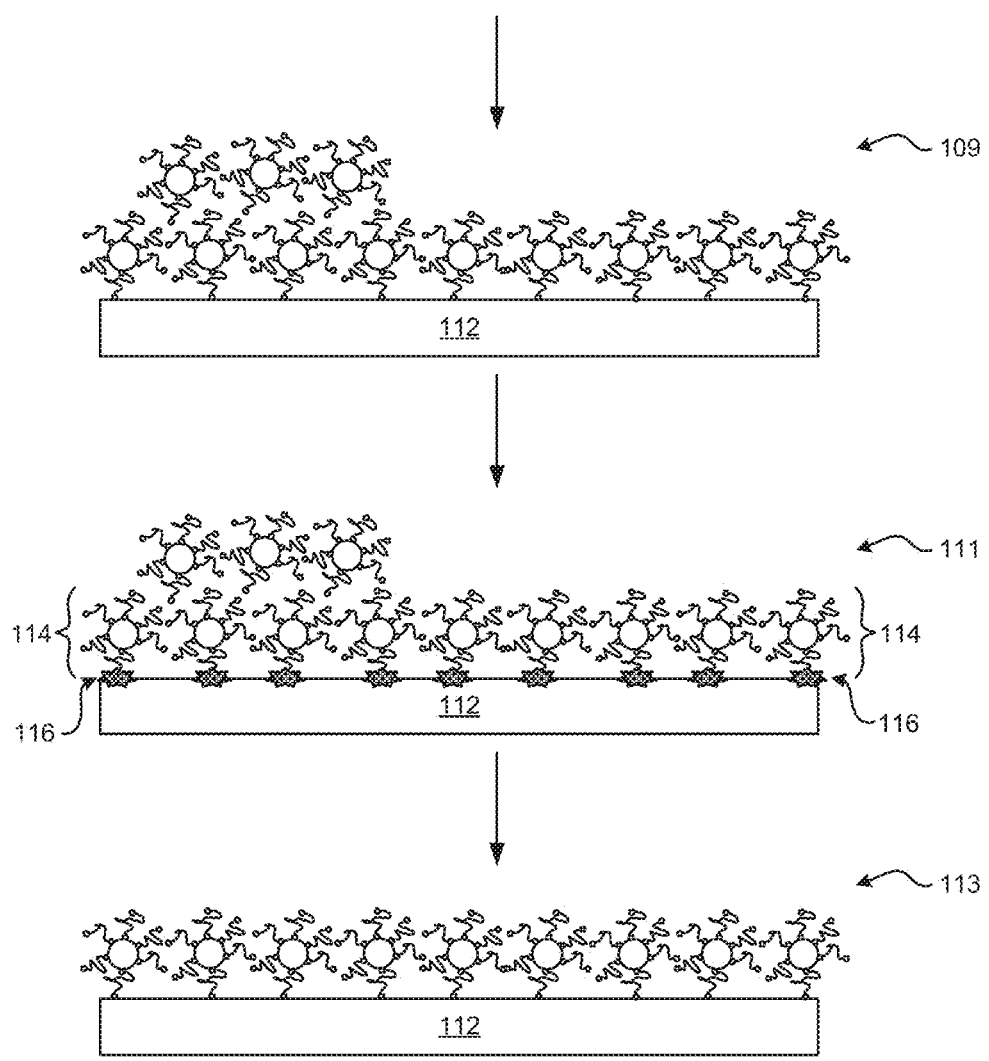

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

Patterning techniques have received continuing interest due to their use in forming nanoscale devices and components. One promising technique, nanoparticle lithography, is based on colloidal self-assembly of inorganic nanoparticles. However, as discussed above, there are numerous challenges associated with nanoparticle lithography involving self-assembling nanoparticles. For example, some of these challenges include: the tendency to form aggregates due to the strong interactions between particles; the difficulty in forming self-terminating, fully packed single monolayers; the lack of control during self-assembly which is usually limited by entropic crystallization during a fast drying step; the difficulty in removing the ligands without affecting the pattern quality; and the lack of a method to transfer the self-assembled pattern to some other materials for various applications.

Various approaches may be implemented to address some or all of the aforementioned challenges. For instance, one approach may use long polymeric ligands and/or polymeric matrices to prevent and/or reduce the aggregation of nanoparticles. However, such an approach is typically utilized to form bulk, three-dimensional composites and doesn't include lithographic applications.

Other approaches may involve the self-assembly of colloidal nanocrystals and formation of various superlattices. However such superlattices are generally not suitable for single monolayer applications or pattern transfer.

Yet other approaches aiming to achieve a monolayer of nanoparticles may involve cumbersome processes that do not yield large area, uniform assemblies over wafer (or disk) size scales, therefore rendering such approaches incompatible with desired manufacturing output and/or goals.

Additional approaches may include utilizing topographic features to direct the self-assembly of nanoparticles. While such approaches may be particularly useful for lithographic applications, they are often limited by "cracking" or aggregation during removal of the ligands. Directed self-assembly using topographic features is also limited by loss of useable space taken by the guiding features (which is detrimental for storage applications). Furthermore, approaches involving nanoparticle or nanosphere lithography may be limited by poor uniformity and inability to show scaling capabilities for features below 10 nm.

Embodiments disclosed herein overcome the aforementioned drawbacks by providing structures having a novel polymer-grafted and/or oligomer-grafted nanoparticle array that self-assembles into a monolayer above a substrate, as well as methods of making and using the same. In various approaches, these monolayers of polymer-grafted and/or oligomer-grafted nanoparticles may have a nanoparticle surface coverage in a range between about 80% to about 120%. In preferred approaches, the structures disclosed herein may include a uniform, densely packed polymer-grafted and/or oligomer-grafted nanoparticle array assembled into a single monolayer above the substrate with no clustering, formation of double layers or empty areas. In more approaches, the degree of ordering in the polymer-grafted and/or oligomer-grafted nanoparticle arrays disclosed herein may be controlled through an annealing process (e.g., solvent annealing, thermal annealing, etc.). In yet more approaches, the self-assembly of the polymer-grafted and/or oligomer-grafted nanoparticle arrays disclosed herein may be preferably directed by the use of topographic and/or chemical contrast patterns. In additional approaches, the features formed by the nanoparticle assemblies may be transferred, via various pattern transfer methods, to the underlying substrate and/or to other materials.

Accordingly, the following description discloses several general and preferred embodiments related to structures having one or more self-terminating monolayers of self-assembling polymer-grafted and/or oligomer-grafted nanoparticles, as well as methods of making and using the same. In particular approaches, the structures described herein may be useful for the fabrication, and/or operation of, magnetic storage systems and component parts thereof, such as magnetic recording media (e.g., patterned magnetic recording media, bit patterned magnetic recording media, heat assisted magnetic recording media, etc.), as well as other devices (e.g., microelectronics, semiconductors electronics, optoelectronics, memories, solar cells, capacitors, detectors, sensors, etc.).

In one general embodiment, a structure includes: a substrate; and a monolayer of nanoparticles positioned above the substrate, where the nanoparticles are each grafted to one or more oligomers and/or polymers, and where each of the polymers and/or oligomers includes at least a first functional group configured to bind to the nanoparticles.

In another general embodiment, a structure includes: a substrate; a structured layer positioned above the substrate, the structured layer comprising a plurality of nucleation regions and a plurality of non-nucleation regions; and a crystalline layer positioned above the structured layer, where the plurality of nucleation regions have a pitch in a range between about 5 nm to about 20 nm.

Self-Assembly of Self-Terminating Monolayers

A major challenge in nanoparticle lithography, where a layer of nanoparticles may be used as an etch mask or as a template for pattern transfer, is the lack of existing, robust methods to produce a single monolayer of nanoparticles on a substrate over full wafer or full disk areas. However, it has been discovered herein that self-terminating monolayers of nanoparticles can be achieved by engineering the ligand-substrate and ligand-ligand interactions in such a way as to promote a strong binding between the substrate and the first layer of particles and a weaker interaction between the first and subsequent layers of particles.

FIG. 1 illustrates a method 100 for forming a self-terminating monolayer of self-assembling nanoparticles, according to one embodiment. As an option, the present method 100 may be implemented in conjunction with features from any other embodiment listed herein, such as those described with reference to the other FIGS. Of course, this method 100 and others presented herein may be used to form structures for a wide variety of devices and/or purposes which may or may not be related to magnetic recording. It should be noted that the method 100 may include more or less steps than those described and/or illustrated in FIG. 1, according to various approaches. It should also be noted that that the method 100 may be carried out in any desired environment. For example, some or all of steps associated with the method 100 may be carried out under vacuum (e.g., in a vacuum reaction chamber) or under a controlled atmosphere. Further, while exemplary processing techniques (e.g., deposition techniques, etching techniques, polishing techniques, etc.) are presented, other known processing techniques may be used for various steps.

As shown in FIG. 1, the method includes providing a plurality of nanoparticles 102 and a plurality of functionalized ligands 104. See structures 101 and structures 103, respectively. In some approaches, each of the nanoparticles 102 may independently include an inorganic material selected from a group consisting of: a metal, a dielectric, and a semiconductor. For example, in one approach two or more of the plurality of nanoparticles 102 may include the same inorganic material. However, in another approach, two or more of the plurality of nanoparticles may comprise different inorganic materials. In preferred approaches, each of the nanoparticles 102 may have a diameter in a range between about 1 nm to about 15 nm. Moreover, in preferred approaches, one, some, or all of the nanoparticles 102 may include a spherical shape. However, in other approaches, one, some of all of the nanoparticles 102 may include an irregular shape, a cubic shape, etc.

In more approaches, each of the plurality of functionalized ligands 104 may be a functionalized polymer or an oligomer. In particular approaches, each of the functionalized ligands 104 (whether a polymeric ligand or an oligomeric ligand) may include at least one of: polystyrene, polymethyl methacrylate, polydimethyl siloxane, polyvinyl pyridine, polyferrocenyldimethylsilane, polyethylene oxide, polylactic acid, etc. or other suitable polymeric and/or oligomeric material as would be understood by one having skill in the art upon reading the present disclosure. In one approach, two or more of the plurality of functionalized ligands 104 may be the same (e.g., include the same polymer or oligomer, the same degree of polymerization, etc.). In another approach, two or more of the plurality of functionalized ligands 104 may be different (e.g., include different polymers or oligomers, a different degree of polymerization, etc.).

In yet more approaches, each of the plurality of functionalized ligands 104 may have a molecular weight in a range between about 1 kDa to about 10 kDa. In further approaches, each of the plurality of functionalized ligands 104 may have a degree of polymerization in a range between about 5 to about 150, where the degree of polymerization indicates the number of repeating units per ligand.

As also shown in FIG. 1, each of the plurality of functionalized ligands 104 includes a first functional group 106 at one end of the ligand, and a second functional group 108 at the other end of the ligand. While the first functional group 106 and the second functional group 108 are shown as terminal functional groups in the embodiment of FIG. 1, it is important to note that the first and/or second functional groups 106, 108 are not limited to terminal positions in the functionalized ligands 104. For instance, in some approaches, the first and/or second functional groups 106, 108 may be present anywhere in the functionalized ligands 104 so long as each ligand may be configured to bind to both a nanoparticle 102 (via the first functional group 106) and a substrate (via the second functional group 108), as discussed in detail below. In various approaches, the first functional group 106 and/or the second functional group 108 may be independently selected from a group consisting of: a hydroxyl, a carboxyl, an amine, trialkoxysylil, diols, thiols, and combinations thereof.

In some approaches, the first functional group 106 may be configured to bind to a nanoparticle 102. In particular approaches, the first functional group 106 may be configured to bind to a nanoparticle via a covalent bond, an ionic bond, a hydrogen bond, van der Waals forces, dispersion forces, dipole-dipole interactions, etc.

In more approaches, the second functional group 108 may be configured to bind to a substrate after an activation/binding process (e.g., a chemical process, thermal process, optical process, etc.). In particular approaches, the second functional group 108 may be configured to bind to a nanoparticle via a covalent bond, an ionic bond, a hydrogen bond, van der Waals forces, dispersion forces, dipole-dipole interactions, etc. In preferred approaches, the second functional group, while configured to bind to a substrate, may not be configured to bind to a nanoparticle 102 and/or to any of the second functional groups 108 associated with other functionalized ligands 104 that may be present.

As shown in FIG. 1, the method 100 includes grafting each nanoparticle 102 with one or more of the ligands 104, thereby forming grafted nanoparticles 110 (nanoparticle-ligand composites). See resulting structure 105. In various approaches, each of the functionalized ligands 104 may be grafted to the nanoparticle 102 via known "grafting to" or "grafting from" techniques. Examples of known "grafting to" and "grafting from" techniques may be found, for instance, in S. K. Kumar, N. Jouault, B. Benicewicz and T. Neely, Macromolecules, 2013, 46, (9). It is important to note that the ligands 104 of the grafted nanoparticles 110 that extend out from, and into, the page are not shown for clarity purposes.

The functionalized ligands 104 grafted to the nanoparticles 102 may serve multiple purposes. For instance, due to steric constraints, the functionalized ligands 104 prevent the nanoparticles 102 from aggregating, effectively screening strong interactions that might otherwise occur such as dipolar, dispersion, Van der Waals forces, etc. The nanoparticle-ligand composites 110 may also exhibit an accessible glass transition temperature above which the composites can be annealed to improve or manipulate the self-assembling process. The functionalized ligands 104 may also afford stable solutions (or suspensions) that facilitate uniform near-monolayer deposition of the nanoparticle-ligand composites 110 by methods that are amenable to large area, large volume applications, such as spin coating, dip-casting, spraying, etc.

As further shown in FIG. 1, the method 100 includes depositing a thin film of the grafted nanoparticles 110 onto a substrate 112. See resulting structure 107. In preferred approaches, the grafted nanoparticles may be dispersed in a suitable solvent and subsequently deposited on the substrate 112 via spin coating, dip casting, spraying, inkjet printing, or other suitable deposition technique as would be understood by one having skill in the art upon reading the present disclosure. Suitable solvents may include toluene, N-methyl-2-pyrrolidone (NMP), acetone, propylene glycol methyl ether acetate (PGMEA), tetrahydrofuran (THF), and/or other solvent compatible with the grafted nanoparticle 110 and/or the desired deposition technique.

In more approaches, the substrate may include a material that is configured to bind to the second functional groups 108 of the functionalized ligands 104 grafted to the nanoparticles 102.

After deposition of the grafted nanoparticles 110 onto the substrate 112, the method 100 may include an optional annealing step. Annealing the grafted nanoparticles 110 deposited on the substrate 112 may induce/drive the grafted nanoparticle 110 assembly to reach its free energy minimum by optimizing the close packing of the grafted nanoparticles 110. See resulting structure 109. In various approaches, this optional annealing step may include solvent annealing and/ or thermal annealing. In some approaches, the annealing conditions (e.g., the length of the annealing step, the temperature, etc.) may be tailored to reach a desired degree of ordering (e.g., a given correlation length, a given distribution of center-to-center distances) in the assembly of grafted nanoparticles 110.

As shown in FIG. 1, after the optional annealing step, the first monolayer 114 of grafted, self-assembled nanoparticles 110 in direct contact with the substrate 112 may be fixed/attached thereto. See resulting structure 111. In specific approaches, fixing/attaching the first monolayer 114 of grafted, self-assembled nanoparticles 110 to the substrate 112 may include providing an activation treatment to enabling a bonding between the second functional groups 108 of the ligands 104 grafted to said nanoparticles and the substrate. The activated bond between the second functional groups 108 of the ligands 104 and the substrate 112 is illustrated by element 116 in FIG. 1. The activated bond between the second functional groups 108 of the ligands 104 and the substrate 112 may include a covalent bond, an ionic bond, a dipole-dipole interaction, a van deer Waals bond, a hydrogen bond, etc. The activation treatment may include a thermal treatment, an optical treatment (e.g., exposure to radiation), a chemical treatment/reaction, or other such activation process as would be understood by one having skill in the art upon reading the present disclosure.

The method 100 also includes rinsing the substrate with a solvent to remove any unbound material (e.g., grafted nanoparticles present above the first monolayer 114 thereof). See resulting structure 113. In some approaches, the solvent may be toluene, NMP, or other suitable solvent as would be understood by one having skill in the art upon reading the present disclosure. In more approaches, the solvent used to rinse the substrate 112 may be the same as the solvent in which the grafted nanoparticles 110 were dispersed during deposition.

In other approaches, the functionalized ligands 104 grafted to the nanoparticles 102 may not include the second functional group 108 (i.e., the functional group that is not attached to the nanoparticle but rather is configured to attach to the substrate 112). In such approaches, physisorption may be used as the mechanism to bind the first monolayer 114 of grafted nanoparticles 110 to the substrate 112.

In one non-limiting example of method 100, a plurality of $Fe_2O_3$ nanoparticles may be grafted to functionalized t-co polystyrene chains, where the first and second functional groups of the polystyrene chains include an amine group and a hydroxyl group, respectively. The amine group of each polystyrene chain binds to a respective nanoparticle, while the hydroxyl group of each polystyrene chain does not bind to any nanoparticle and/or to the hydroxyl groups of the other polystyrene chains. A thin film of polystyerene-grafted $Fe_2O_3$ nanoparticles may then be spin coated from a toluene solution and solvent annealed in a toluene vapor. The solvent annealing of the polystyerene-grafted $Fe_2O_3$ nanoparticles may induce/optimize the self-assembly and/or close packing of the nanoparticles on the substrate so as to minimize the free energy of the nanoparticle assembly. After solvent annealing, the sample may be placed in an oven or hot plate to bind the hydroxyl groups of the polystyrene chains that are in direct contact with the substrate to the substrate. Any unbound material may then be removed by rinsing the resulting structure in a suitable solvent such as NMP or toluene.

Directed Self-Assembly of Self-Terminating Monolayer or Near Monolayer Films

Orientational order, translational order, placement registration, defect densities and size and placement accuracy are all parameters that need to be controlled for certain applications. Some applications such as semiconductor lithography may demand highly periodic, defect free periodic arrays. Other applications such as bit patterned media may demand special arrangements on "slightly distorted" circular tracks. Moreover, other applications such as templated growth of magnetic recording media may call for a particular distribution of defects and nearest neighbor distances.

As the self-assembly of nanoparticle patterns is a free energy minimization process, methods disclosed herein are able to pre-determine or pre-program a desirable outcome by engineering the boundary conditions at the substrate to achieve a target pattern after self-assembly. Directed self-assembly techniques may be used to direct the assembly of nanoparticles, biomolecules and block copolymers. However, no solutions are yet available to yield directed self-assembly of nanoparticle monolayers that are uniform over large scales and that are suitable for lithographic or patterning applications.

Accordingly, the methods disclosed herein provide topographic and/or chemical guiding methods that yield uniform nanoparticle assemblies with a desired degree of ordering and keep introduction of non-uniformities to a minimum. Such methods may include directed self-assembly with shallow topographic guiding (interstitial guiding), tall topographic guiding (substitution guiding), and/or chemical contrast guiding. For example, in various approaches, a substrate may include an array of shallow topographic features, an array of tall topographic features, an array of chemical contrast patterns, and/or combinations thereof, to direct the self-assembly of polymer and/or oligomer grafted nanoparticles deposited thereon.

As noted above, formation of a self-terminating monolayer of nanoparticles (see e.g., resulting structure 112 of FIG. 1) may be desired in some approaches. For instance, formation of self-terminating monolayers may be important for many applications that may not tolerate the existence of double layers of nanoparticles and/or empty areas within a particular nanoparticle layers. Accordingly, in such approaches, the topographic and/or guiding methods described herein may be used to direct the self-assembly of nanoparticles grafted to polymer and/or oligomer ligands that each include a first functional group configured to bind to their respective nanoparticle and a second functional group configured to bind to a substrate (but not another nanoparticle and/or ligand).

However, in other approaches, formation of a near monolayer of nanoparticles may be desired. In such approaches, these topographic and/or guiding methods may be therefore be used to direct the self-assembly of nanoparticles grafted to polymer and/or oligomer ligands that each include a first functional group configured to bind to their respective nanoparticle but do not include a second functional group configured to bind to a substrate. By using ligands without this second functional group, and by controlling the concentration of the solution and the deposition method, "near monolayer films" of nanoparticles may be achieved where said films are close to a single monolayer with a coverage of ≥80% monolayer and/or ≤20% of a double layer of nanoparticles or empty holes.

Shallow Topographic Guiding

In polymer or oligomer grafted nanoparticles, the polymeric or oligomeric ligands screen most of the strong particle-particle interactions that are commonly observed in short-ligand colloidal self-assembly. Thus, with polymer or oligomer grafted nanoparticles, the self-assembly process is dominated mostly by steric forces. The inventors have discovered a viable strategy to direct the self-assembly of nanoparticles by engineering substrates to impose entropic restrictions to the conformation of the polymeric or oligomeric chains during assembly. Shallow, thin guiding features may serve this purpose in various approaches, as discussed below.

Figure 2A:
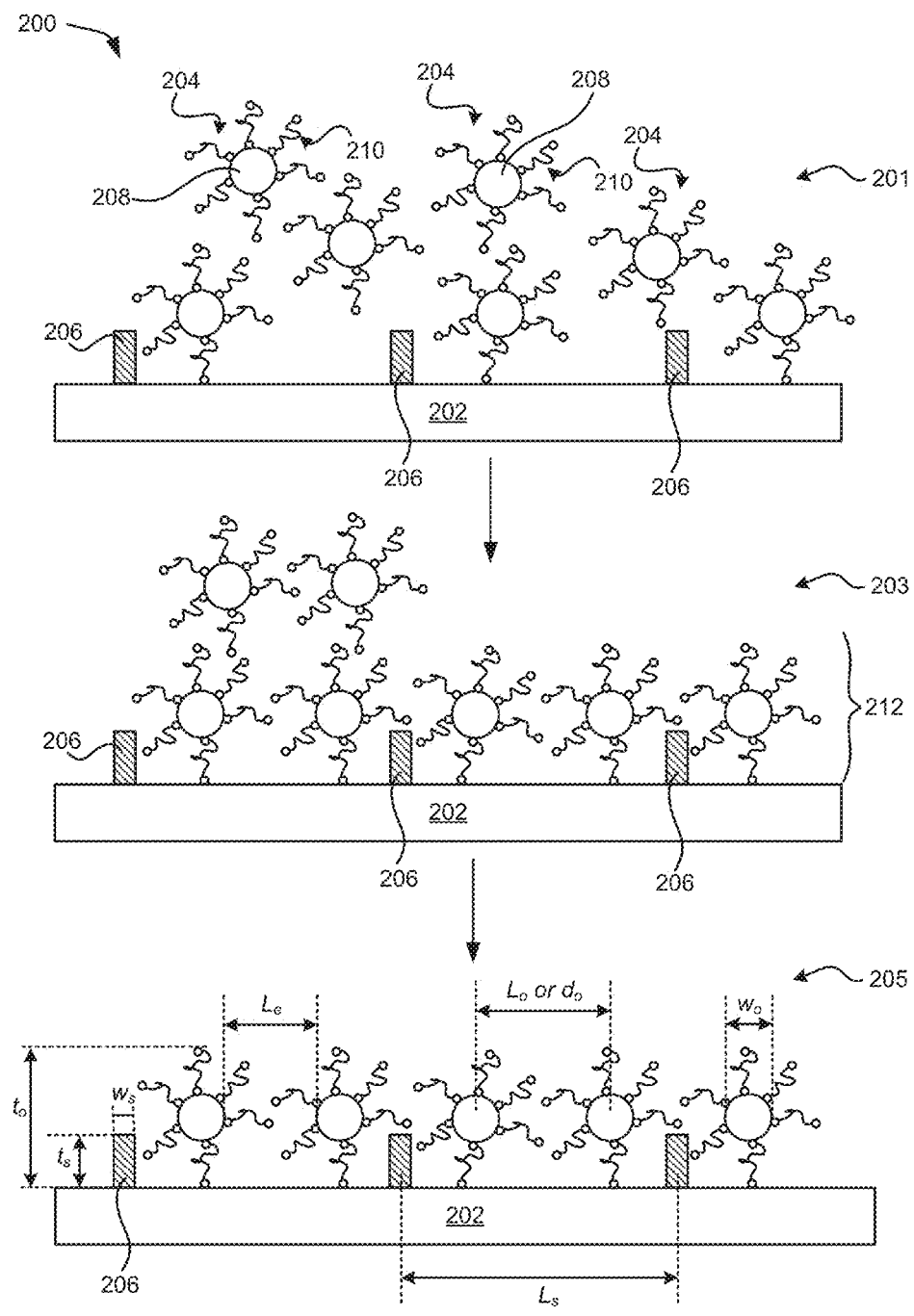
FIG. 2A is a flowchart of a method for forming a self-terminating monolayer of self-assembling nanoparticles via shallow topographic guiding, according to one embodiment.

FIG. 2A illustrates a method 200 for forming a self-terminating monolayer or near monolayer of nanoparticles via shallow topographic guiding, according to one embodiment. As an option, the present method 200 may be implemented in conjunction with features from any other embodiment listed herein, such as those described with reference to the other FIGS. Of course, this method 200 and others presented herein may be used to form structures for a wide variety of devices and/or purposes which may or may not be related to magnetic recording. It should be noted that the method 200 may include more or less steps than those described and/or illustrated in FIG. 2A, according to various approaches. It should also be noted that that the method 200 may be carried out in any desired environment. For example, some or all of steps associated with the method 200 may be carried out under vacuum (e.g., in a vacuum reaction chamber). Further, while exemplary processing techniques (e.g., deposition techniques, etching techniques, polishing techniques, etc.) are presented, other known processing techniques may be used for various steps.

As shown in FIG. 2A, the method 200 includes providing a substrate 202 and depositing a plurality of grafted nanoparticles 204 thereon, where the substrate 202 includes a plurality of guiding features 206 configured to direct the self-assembly of the grafted nanoparticles 204. See structure 201. As also shown in FIG. 2A, each of the plurality of grafted nanoparticles 204 includes a nanoparticle core 208 grafted to one or more ligands 210. It is important to note that the ligands 210 of the grafted nanoparticles 204 that extend out from, and into, the page are not shown for clarity purposes.

Each of the ligands 210 may independently be a polymer ligand or an oligomer ligand, in some approaches. Moreover, in various approaches, each of the plurality of grafted nanoparticles 204 may include the same materials, arrangement/structure and/or properties as previously disclosed herein (e.g., as disclosed with reference to structures 101, 103, and 105 of FIG. 1). For example, in particular approaches aimed at forming a self-terminating monolayer of nanoparticles, the grafted nanoparticles 204 may each include one or more ligands 210 having a first functional group configured to bind to their respective nanoparticle core 208 and a second functional group configured to bind to the substrate 202 (but not another nanoparticle core 208 and/or ligand 210). However, in approaches aimed at forming a near monolayer of nanoparticles, the grafted nanoparticles 204 may each include one or more ligands 210 having a first functional group configured to bind to their respective nanoparticle core 208 but not a second functional group configured to bind to the substrate 202. In more approaches, the plurality of grafted nanoparticles 204 may be dispersed in a suitable solvent and subsequently deposited on the substrate 202 via spin coating, dip casting, spraying, inkjet printing, or other suitable deposition technique as would be understood by one having skill in the art upon reading the present disclosure.

After deposition of the grafted nanoparticles 204 onto the substrate 202, the method 200 may include an optional annealing step, which may induce the grafted nanoparticle 204 assembly to reach its free energy minimum in the presence of the guiding features 206. See resulting structure 203. In numerous approaches, the annealing parameters, the dimensions of the guiding features 206 and/or the distribution of the guiding features 206 may be tailored so as to achieve a desired degree of ordering in the assembly of grafted nanoparticles 204, where the desired ordering may include nearly perfect single crystal arrays or somewhat distorted arrays depending on the level of commensurability between the guiding features and the self-assembled nanoparticles. As noted previously, the annealing may include thermal annealing and/or solvent annealing using a solvent suitable for the polymer and/or oligomer ligands grafted to the nanoparticles.

In approaches aimed at forming a self-terminating monolayer of nanoparticles, after the optional annealing step, the first monolayer 212 of grafted nanoparticles 204 in direct contact with the substrate 202 may be fixed/attached thereto via an activation treatment configured to enable/promote bonding between the second functional groups of the ligands 210 grafted to said nanoparticles and the substrate. Any unbound material (e.g., grafted nanoparticles 204 not attached to the substrate 202) may be removed by rinsing the substrate 202 with a suitable solvent. See resulting structure 205.

In approaches aimed at forming a near monolayer of nanoparticles, controlling the thickness of the deposited film of grafted nanoparticles 204 (each of which include polymer and/or oligomer ligands that do not have the second functional groups configured to attach to the substrate 202) may be sufficient to produce a film with ≥80% nanoparticle coverage, ≤20% presence of a double layer of nanoparticles, and/or ≤20% of empty holes in a single layer.

As shown in FIG. 2A, the plurality of guiding features 206 may protrude above the substrate 202 and include an array of pillars. In approaches where the guiding features 206 include an array of pillars, each of the pillars may have a rounded cross sectional shape, an elliptical cross sectional shape, a rectangular cross sectional shape, a square cross sectional shape, an irregular cross sectional shape, etc., where the cross section is taken perpendicular to the substrate normal. It is important to note, however, that the plurality of guiding features 206 are not limited to an array of pillars, as shown in FIG. 2A for clarity purposes only. For instance, in various approaches, the plurality of guiding features may include an array of stripes 214 to direct the self-assembly of the grafted nanoparticles 204 (FIG. 2B, ligands grafted to nanoparticles 204 not shown), an array of dots/spheres 216 to direct the self-assembly of the grafted nanoparticles 204 (FIG. 2C, ligands grafted to nanoparticles 204 not shown). In more approaches, the plurality of guiding features may include an array of trenches 218 to direct the self-assembly of the grafted nanoparticles 204 (FIG. 2D, ligands grafted to nanoparticles 204 not shown). In approaches where the guiding features include an array of trenches, the trenches may induce orientational order (single raft, no translation order), as discussed in detail later, and the trench width may be greater than $nd_o$, where $d_o$ corresponds to the shortest lattice plane spacing associated with the self-assembled lattice of grafted nanoparticles. In yet more approaches, the plurality of guiding features may include an array of holes to direct the self-assembly of the grafted nanoparticles 220 (cross sectional view shown in FIG. 2E, ligands grafted to nanoparticles 204 not shown). In approaches where the plurality of guiding features 206 may include holes, each of the holes may be a round or square depression in the substrate 202 with a diameter in the range of about the diameter of the nanoparticle core to about 3 times the pitch (the center to center spacing between nanoparticle cores), depending on the desired degree of ordering.

In still more approaches, the plurality of guiding features 206 may include one or more of pillars, dots, stripes, holes, trenches, etc, or other suitably shaped guiding feature as would become apparent to one skilled in the art upon reading the present disclosure.

With continued reference to FIG. 2A, the substrate 202 may include a sparse arrangement of guiding features 206, a dense arrangement of guiding features 206, or a combination of sparse and dense arrangements of guiding features 206, in yet more approaches. In further approaches, the plurality of guiding features 206 may be commensurate or incommensurate with the periodicity of the self-assembled grafted nanoparticles 204 depending on the targeted degree of ordering. In additional approaches, the substrate 202 may include a periodic arrangement of guiding features 206, a non-periodic arrangement of guiding features 206, or a combination of periodic and non-periodic arrangements of guiding features 206.

In preferred approaches for directed self-assembly using shallow topographic guiding, the plurality of guiding features 206 may be positioned at interstitial sites between the self-assembled grafted nanoparticles 204. Positioning the shallow guiding features 206 at interstitial sites between the self-assembled grafted nanoparticles 204 may be advantageous as such positioning neither wastes any valuable surface area nor affects the overall feature density.

According to one particular approach, the pitch, (i.e., center to center spacing), $L_s$, between guiding features 206 may be about equal to or greater than the pitch, $L_o$, between adjacent self-assembled grafted nanoparticles 204 ($L_s \geq L_o$). In preferred approaches, the pitch, $L_o$, between adjacent self-assembled grafted nanoparticles 204 may be in a range between about 5 to about 15 nm. In more approaches, the pitch, $L_s$, between guiding features 206 may be about equal to or greater than the shortest lattice plane spacing, $d_o$, associated with the self-assembled lattice of grafted nanoparticles 204 ($L_s \geq d_o$).

In approaches where a high degree of ordering in the self-assembled grafted nanoparticles 204 is desired, then a commensurability relationship between the guiding features 206 and the self-assembled lattice/pattern of nanoparticles 204 may need to be maintained. For instance, the guiding features 206 may be commensurate with the periodicity of the nanoparticle assembly when $L_s \approx nL_o$ and/or $L_s \approx nd_o$, where n is an integer equal to or greater than 1.

According to one particular approach, the width, $w_s$, of each of the guiding features 206 may be about equal to or less than the interparticle distance (i.e., outer edge-to-outer edge distance), $L_e$, between the nanoparticle cores 208 of adjacent self-assembled grafted nanoparticles 204 ($w_s \leq L_e$). In preferred approaches, the width, $w_s$, of each of the guiding features 206 may be about equal to half of the interparticle distance, $L_e$, between the nanoparticle cores 208 of adjacent self-assembled grafted nanoparticles 204 ($w_s \approx L_e/2$).

Figure 2B:
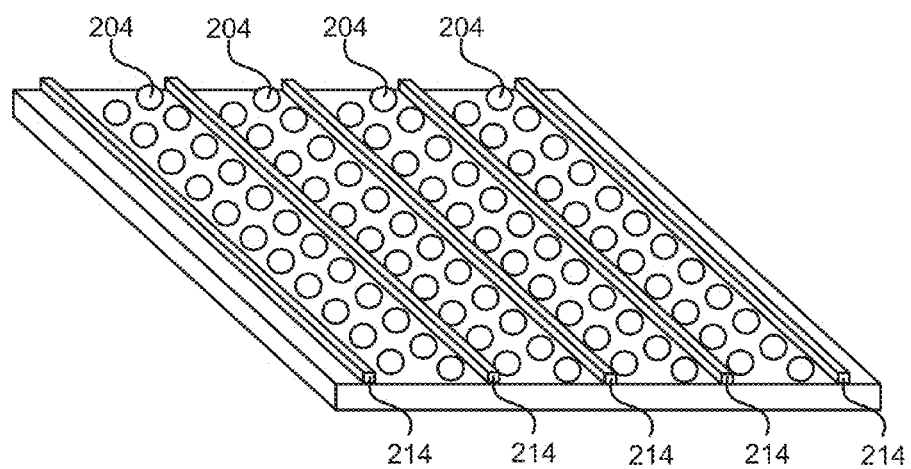
FIG. 2B is a schematic representation of a substrate including an array of striped features configured to direct the self-assembly of nanoparticles deposited on the substrate, according to one embodiment.

In some approaches, the length of the guiding features 206 may be about equal to the length of the substrate 202, thereby forming an array of stripes (see e.g., FIG. 2B). In other approaches suitable for magnetic recording disks, the stripes may comprise generally circumferential lines or generally radial lines In approaches where the guiding features 206 have a pillar shape, such as shown in FIG. 2A, the length and/or the width of the guiding features may preferably be about equal to or less than the interparticle distance, $L_e$, between the nanoparticles cores 208 of adjacent grafted nanoparticles 204. Likewise, in approaches where the guiding features are dots, the diameter of each of the dots may preferably be about equal to or less than the interparticle distance, $L_e$, between the nanoparticles cores 208 of adjacent grafted nanoparticles 204.

With continued reference to structure 205 of FIG. 2A, the height, $t_s$, of each of the guiding features 206 may be about equal to or less than a thickness, $t_o$, of the monolayer 212 of self-assembled grafted nanoparticles 204 ($t_s \leq t_o$). In preferred approaches, the height, $t_s$, of each of the guiding features 206 may be half of the thickness, $t_o$, of the monolayer 212 of self-assembled grafted nanoparticles 204 ($t_s \approx t_o/2$).

According to yet another particular approach, the diameter, $w_o$, of the core 208 of each of the grafted nanoparticles 204 and/or the degree of polymerization, N, associated with each of the ligands 210 grafted to the nanoparticle cores 208 may be selected to produce a desired/targeted pitch, $L_o$, between adjacent self-assembled grafted nanoparticles 204. In preferred approaches, the diameter of each nanoparticle core 208 may be in a range between about 1 nm to about 15 nm, and/or the degree of polymerization for each of the ligands 210 may be in a range between about 5 to about 150.

The self-assembly of the grafted nanoparticles 204 typically occurs at length scales of $5 \leq L_o \leq 50$ nm full pitch. Thus, creating the guiding features 206 with the proper dimensions $L_s$, $w_s$ and $t_s$ to facilitate shallow topographical guiding may be challenging, yet important. In various approaches, the method 200 may further include forming the plurality of guiding features 206 from block copolymer patterns (FIG. 3), nanoimprinted patterns (FIG. 4), and/or via lithography (FIG. 5) prior to the deposition of the nanoparticles 204 on the substrate 202.

Figure 3:
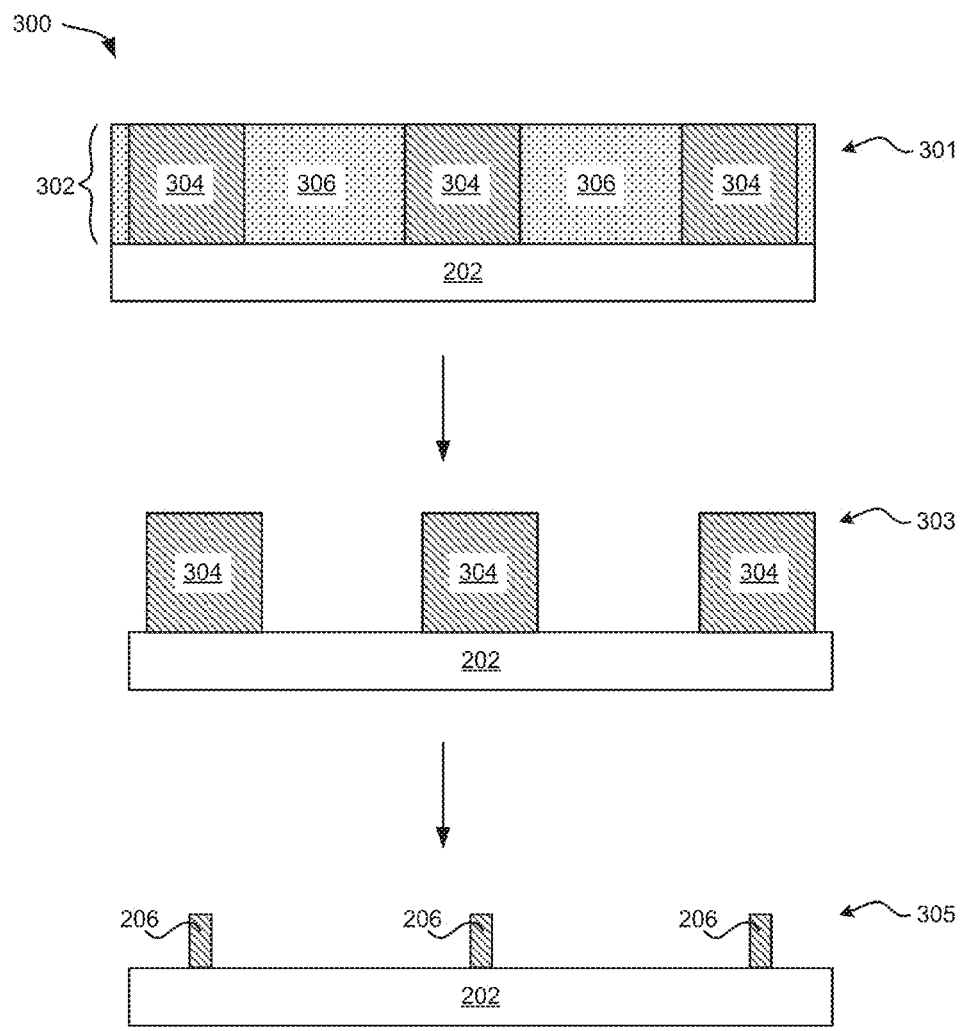
FIG. 3 is a flowchart of a method for forming guiding features on a substrate via block copolymer patterns, according to one embodiment.

For instance, FIG. 3 illustrates an exemplary method 300 for forming the guiding features 206 via block copolymer patterns, according to one embodiment. As an option, the method 300 may be implemented in conjunction with features from any other embodiment listed herein, such as those described with reference to the other FIGS. It should be noted that the method 300 may include more or less steps than those described and/or illustrated in FIG. 3, according to various approaches. It should also be noted that that the method 300 may be carried out in any desired environment. For example, some or all of steps associated with the method 300 may be carried out under vacuum (e.g., in a vacuum reaction chamber).

As shown in FIG. 3, a layer of material 302 comprising a self-assembling block copolymer is deposited onto the substrate 202. See resulting structure 301. A self-assembling block copolymer typically contains two or more different polymeric block components 304, 306 that are immiscible with one another. Under suitable conditions, the two or more immiscible polymeric block components 304, 306 separate into two or more different phases or microdomains on a nanometer scale, thereby forming ordered patterns of isolated nano-sized structural units. In some approaches, the substrate 202 may be chemically patterned to guide or direct the microphase separation of the block copolymer components. One of the polymeric block components 306 may be selectively removed via a dry or wet process to leave a pattern of the un-removed polymeric block component(s) 304. See resulting structure 303. Portions of the un-removed polymeric block component(s) 304 may then be shaped accordingly via known etching techniques to form the plurality of guiding features 206 having desired dimensions (e.g., $L_s$, $w_s$, $t_s$). See resulting structure 305 of FIG. 3.

For example, in on approach, the block copolymer layer 302 may include poly(styrene-b-methyl methacrylate) (PS-b-PMMA), and the PMMA block may be removed using oxygen plasma. The remaining PS guiding features may be thinned down with additional $O_2$ plasma etch until the targeted $L_s$, $w_s$ and $t_s$ are achieved.

In various approaches, the two or more immiscible polymeric block components of the block copolymer layer 302 may form spherical, cylindrical, or lamellar polymeric domains. For instance, in approaches where the guiding features are desired to be striped structures, the block copolymer layer 302 may be made of a lamellae-forming block copolymer with the lamellae oriented perpendicular to the substrate. In approaches where the guiding features are desired to be pillar-type structures with rounded cross-sectional shapes, the block copolymer layer 302 may be made of a cylinder forming block copolymer where the cylinders lie parallel to the substrate plane. Moreover, in approaches where the guiding features are desired to be dots, the block copolymer layer 302 may be made of perpendicularly oriented cylinders or a monolayer of a sphere-forming block copolymer.

Figure 4:
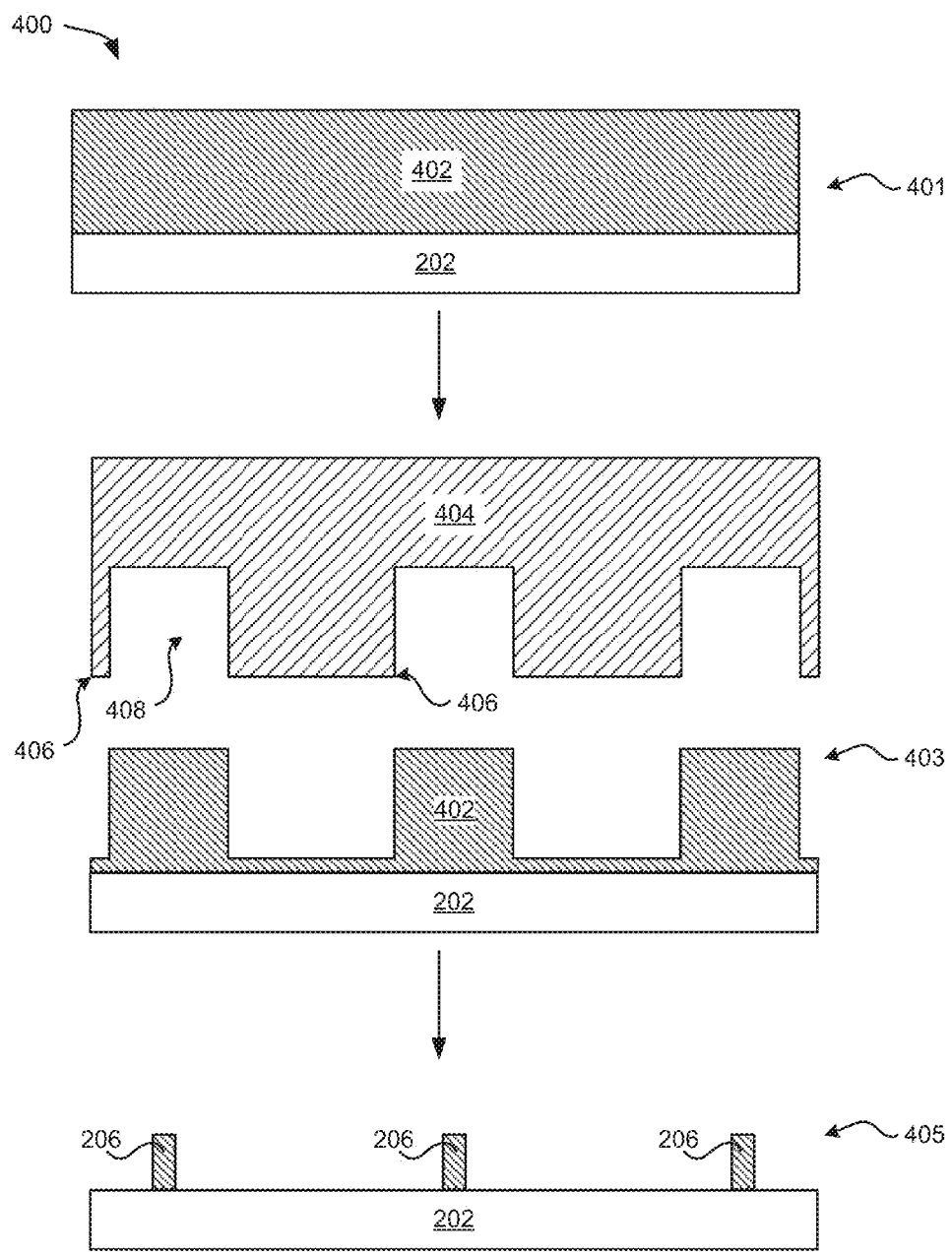
FIG. 4 is a flowchart of a method for forming guiding features on a substrate via nanoimprint lithography (NIL), according to one embodiment.

FIG. 4 illustrates another exemplary method 400 for forming the guiding features 206 via nanoimprint lithography (NIL), according to one embodiment. As an option, the method 400 may be implemented in conjunction with features from any other embodiment listed herein, such as those described with reference to the other FIGS. It should be noted that the method 400 may include more or less steps than those described and/or illustrated in FIG. 4, according to various approaches. It should also be noted that that the method 400 may be carried out in any desired environment. For example, some or all of steps associated with the method 400 may be carried out under vacuum (e.g., in a vacuum reaction chamber).

As shown in FIG. 4, a resist layer 402 is deposited onto the substrate 202. See resulting structure 401. A nanoimprint mold 404 may then be provided, where said mold/template has a guiding pattern intended to be transferred to the resist layer 402, the guiding pattern including a plurality of protruding features 406 with cavity regions 408 therebetween. The nanoimprint mold 404 may then be placed directly on the resist layer 402 to transfer the guiding pattern to the resist layer 402. See resulting structure 403. The nanoimprint mold 404 may be removed, and portions of the remaining resist layer 402 may be shaped accordingly via known etching techniques (e.g., reactive ion etching) to form the plurality of guiding features 206 having desired dimensions (e.g., $L_s$, $w_s$, $t_s$). See resulting structure 405 of FIG. 4.

Figure 5:
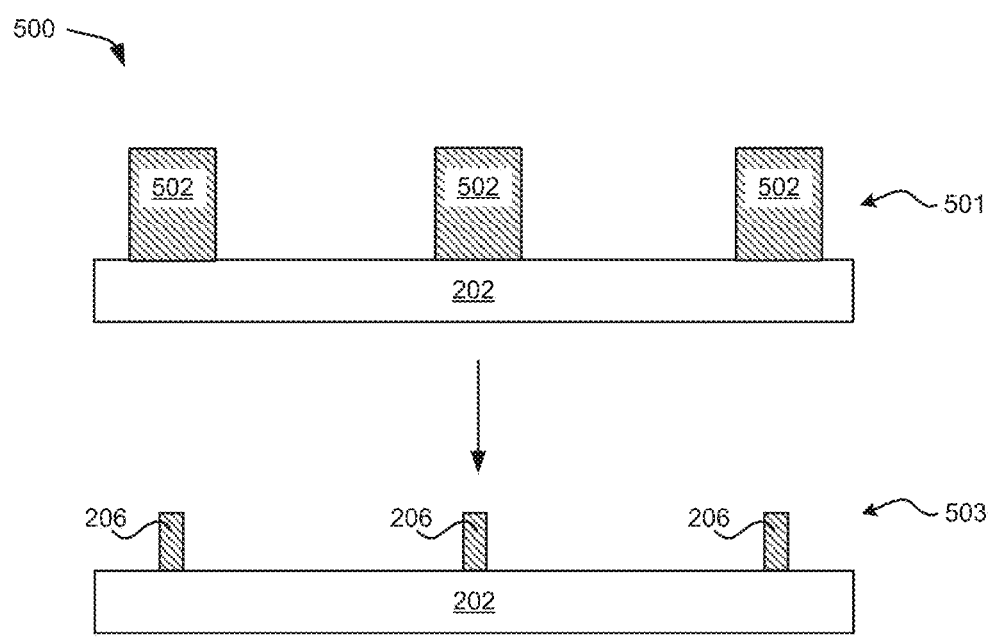
FIG. 5 is a flowchart of a method for forming guiding features on a substrate via lithography, according to one embodiment.

FIG. 5 illustrates yet another exemplary method 500 for forming the guiding features 206 via lithography, according to one embodiment. As an option, the method 500 may be implemented in conjunction with features from any other embodiment listed herein, such as those described with reference to the other FIGS. It should be noted that the method 500 may include more or less steps than those described and/or illustrated in FIG. 5, according to various approaches. It should also be noted that that the method 500 may be carried out in any desired environment. For example, some or all of steps associated with the method 500 may be carried out under vacuum (e.g., in a vacuum reaction chamber).

As shown in FIG. 5, a resist layer 502 is deposited onto the substrate 202, and lithography such as photolithography or e-beam lithography may be used to produce a pattern in the resist layer 502. See resulting structure 501. Portions of the remaining resist layer 502 may then be shaped accordingly via known etching techniques (e.g., reactive ion etching) to form the plurality of guiding features 206 having desired dimensions (e.g., $L_s$, $w_s$, $t_s$). See resulting structure 503.

Figure 2C:
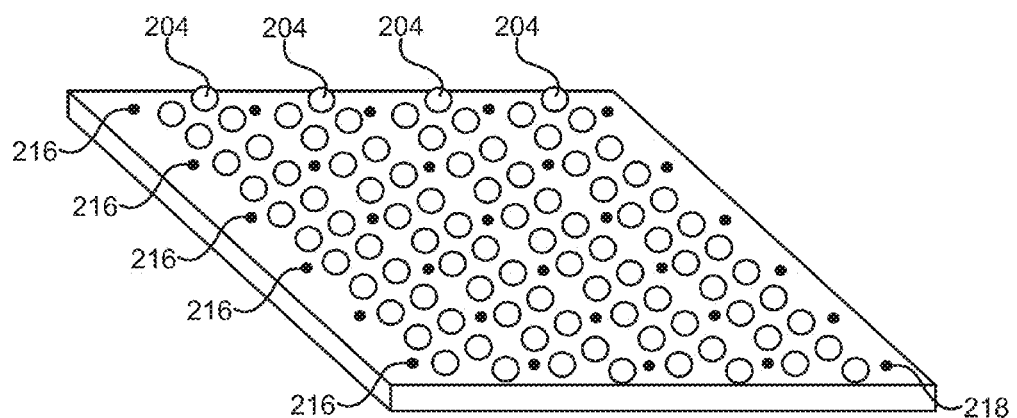
FIG. 2C is a schematic representation of a substrate including an array of spherical features ("dots") configured to direct the self-assembly of nanoparticles deposited on the substrate, according to one embodiment.
Figure 2D:
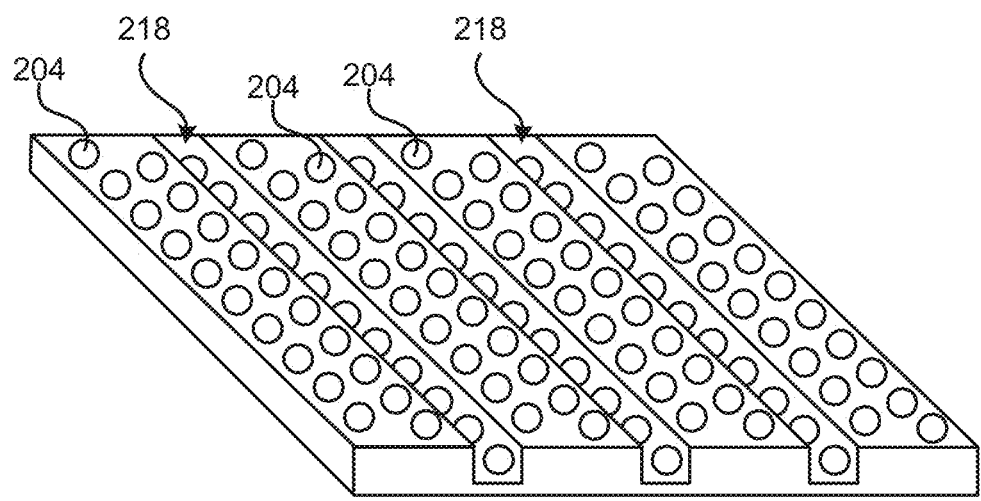
FIG. 2D is a schematic representation of a substrate including an array of trenches configured to direct the self-assembly of nanoparticles deposited on the substrate, according to one embodiment.
Figure 2E:
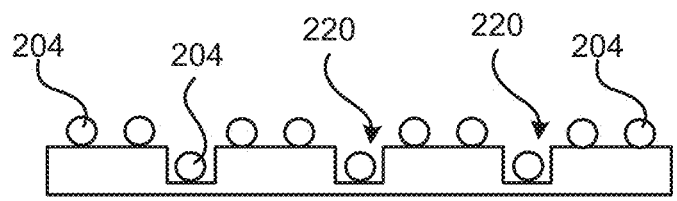
FIG. 2E is a schematic representation of a substrate including an array of holes configured to direct the self-assembly of nanoparticles deposited on the substrate, according to one embodiment.

It is important to note that while the plurality of guiding features 206 may be formed using block copolymer patterns, nanoimprint patterns, and/or lithography, as described in FIGS. 3-5, these methods serve as examples only and are not exhaustive. Other methods may be used to form similar patterns of the guiding features 206 on the substrate 202, as would be understood by one having skill in the art upon reading the present disclosure. Moreover, it is also important to note that block copolymer patterns, nanoimprint patterns, lithography, and/or other known patterning techniques may each be used to form guiding features 206 that include an array of pillars (e.g., as shown in the embodiment of FIG. 2A), an array of striped structures (e.g., as shown in the embodiment of FIG. 2B), an array of spheres/dots (e.g., as shown in the embodiment of FIG. 2C), an array of trenches (e.g., as shown in the embodiment of FIG. 2D), and/or an array of holes (e.g., as shown in the embodiment of FIG. 2E).

Tall Topographic Guiding (Graphoepilaxy)

Methods for forming a self-terminating monolayer or near monolayer film of nanoparticles via tall topographic guiding may preferably use guiding features that are positioned on a substrate such that each guiding feature replaces one nanoparticle, effectively acting as a substitution.

Figure 6:
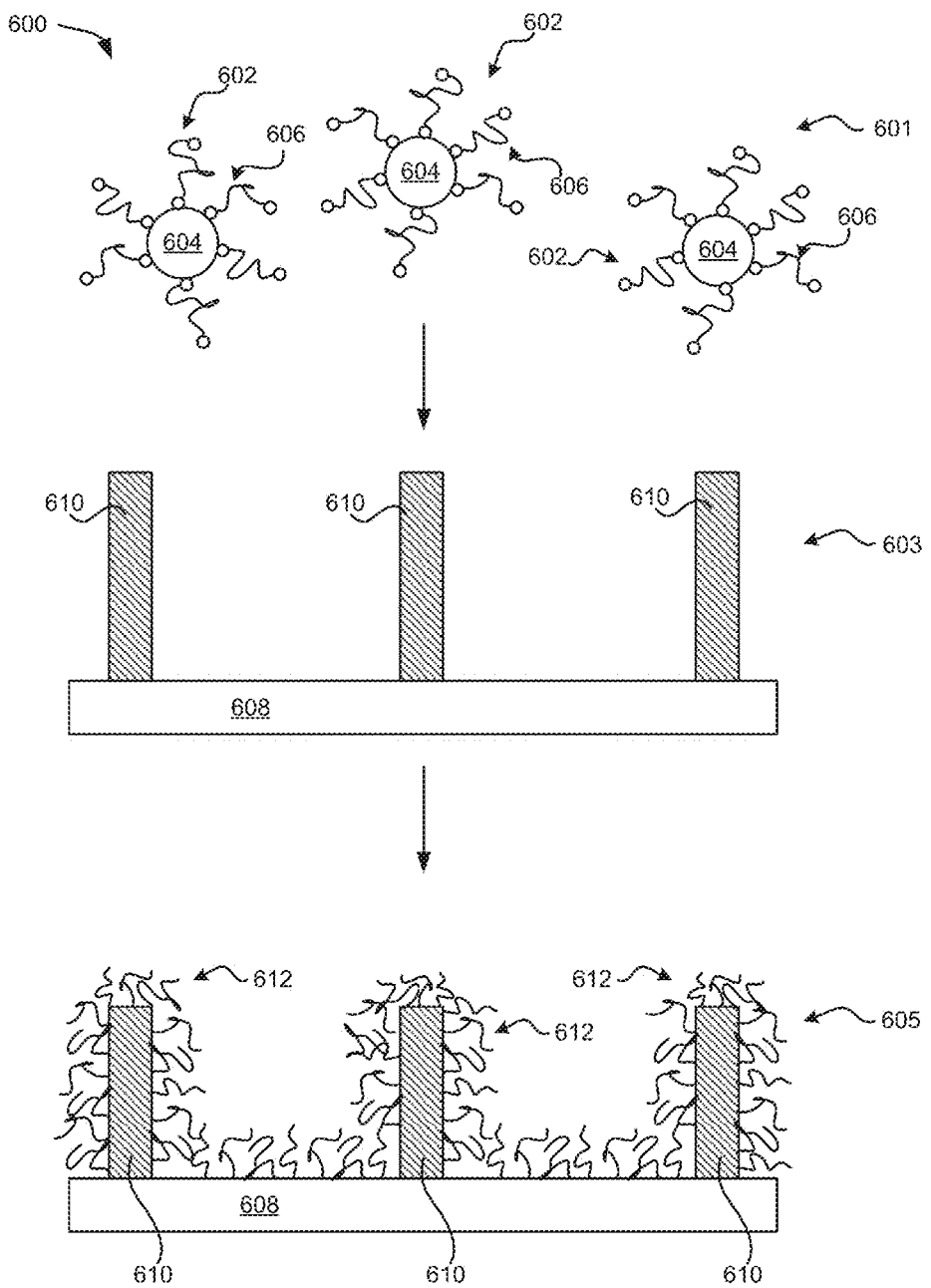
FIG. 6 is a flowchart of a method for forming a self-terminating monolayer of self-assembling nanoparticles via tall topographic guiding, according to one embodiment.
Figure 6:
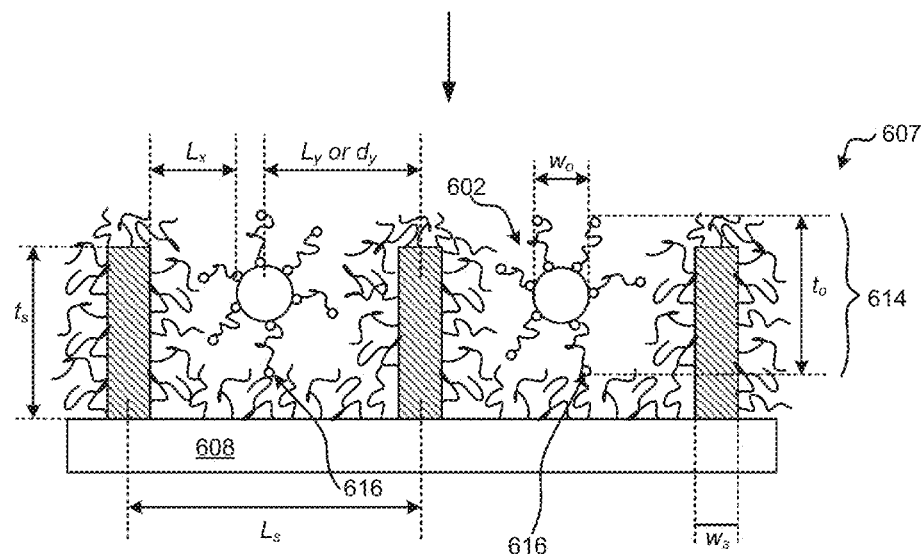
Figure 6:
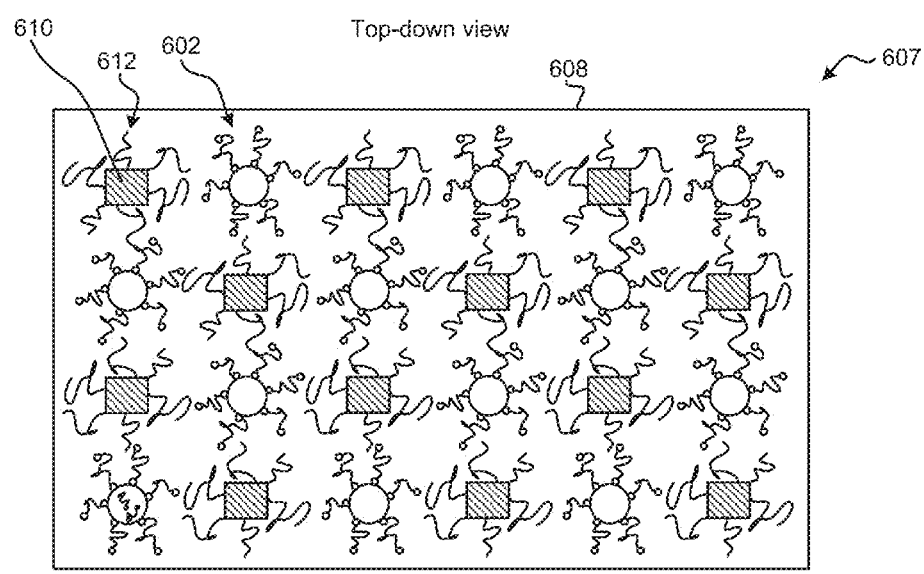

FIG. 6 provides an exemplary method 600 for forming a self-terminating monolayer or near monolayer of nanoparticles via tall topographic guiding, according to one embodiment. As an option, the present method 600 may be implemented in conjunction with features from any other embodiment listed herein, such as those described with reference to the other FIGS. Of course, this method 600 and others presented herein may be used to form structures for a wide variety of devices and/or purposes which may or may not be related to magnetic recording. It should be noted that the method 600 may include more or less steps than those described and/or illustrated in FIG. 6, according to various embodiments. It should also be noted that that the method 600 may be carried out in any desired environment. For example, some or all of steps associated with the method 600 may be carried out under vacuum (e.g. in a vacuum reaction chamber). Further, while exemplary processing techniques (e.g. deposition techniques, etching techniques, polishing techniques, etc.) are presented, other known processing techniques may be used for various steps.

As shown in FIG. 6, the method 600 includes providing a plurality of grafted nanoparticles 602, each of which includes a nanoparticle core 604 grafted to one or more polymeric ligands and/or oligomeric ligands 606. See structures 601. It is important to note that the ligands 606 of the grafted nanoparticles 602 that extend out from, and into, the page are not shown for clarity purposes. The degree of polymerization, N, associated with each of the ligands 606 may be between about 5 to about 150, in some approaches.

In various approaches, each of the plurality of grafted nanoparticles 602 may include the same materials, arrangement/structure and/or properties as previously disclosed herein (e.g., as disclosed with reference to structures 101, 103, and 105 of FIG. 1). For example, in particular approaches aimed at forming a self-terminating monolayer of nanoparticles, the grafted nanoparticles 602 may each include one or more ligands 606 having a first functional group configured to bind to their respective nanoparticle core 604 and a second functional group configured to bind to the substrate 608 (but not another nanoparticle core 604 and/or ligand 606). However, in approaches aimed at forming a near monolayer of nanoparticles, the grafted nanoparticles 602 may each include one or more ligands 606 having a first functional group configured to bind to their respective nanoparticle core 604 but not a second functional group configured to bind to the substrate 608.

As also shown in FIG. 6, the method 600 includes providing a substrate 608, where the substrate 608 includes a plurality of guiding features 610 configured to direct the self-assembly of the grafted nanoparticles 602. See structure 603. Each of the guiding features 610 may be formed on the substrate 608 via the techniques described herein (e.g., by using block copolymer patterns, nanoimprint patterns, lithography, etc.). Further, the guiding features 610 may include an array of pillar-structures, stripes, dots, trenches, holes, and/or combinations thereof.

In preferred approaches, the upper surface of the substrate 608 and/or the exposed surfaces of the guiding features 610 may be coated with a monolayer of a functionalized polymer and/or oligomer brush 612 that is configured to bind to said surfaces. See structure 605. It is important to note that functionalized polymer and/or oligomer brush 612 extending out from, and into, the page is not shown for clarity purposes. In preferred approaches, the functionalized polymer and/or oligomer brush 612 may have a length that is about equal to or similar to the length of the polymer and/or oligomer ligands grafted to the nanoparticles 602. In more approaches, the functionalized polymer and/or oligomer brush 612 may include a material that is the same as the polymer and/or oligomer ligands grafted to the nanoparticles 602. It is also of note that in some approaches, the upper surface of the substrate 608 and/or the exposed surfaces of the guiding features 610 may not be coated with a monolayer of the functionalized polymer and/or oligomer brush 612.

As further shown in FIG. 6, the method 600 includes forming a monolayer 614 of the grafted nanoparticles 602 onto the substrate 608. See structure 607. In various approaches, the plurality of grafted nanoparticles 602 may be dispersed in a suitable solvent and subsequently deposited on the substrate 608 via spin coating, dip casting, spraying, inkjet printing, or other suitable deposition technique as would be understood by one having skill in the art upon reading the present disclosure. The method 600 may include an optional annealing step, which may induce/drive the grafted nanoparticle 602 assembly to reach its free energy minimum in the presence of the guiding features 606. See resulting structure 609. In numerous approaches, the annealing parameters, the dimensions of the guiding features 610 and/or the distribution of the guiding features 610 may be tailored so as to achieve a desired degree of ordering in the grafted nanoparticle 602 assembly, where the desired ordering may include nearly perfect single crystal arrays or somewhat distorted arrays depending on the level of commensurability between the guiding features and the self-assembled nanoparticles. As discussed previously, the annealing may include thermal annealing and/or solvent annealing using a solvent suitable for the polymer and/or oligomer ligands grafted to the nanoparticles.

In approaches aimed at forming a self-terminating monolayer of nanoparticles, after the optional annealing step, the first monolayer 614 of grafted nanoparticles 602 in direct contact with the substrate 608 may be fixed/attached thereto via an activation treatment configured to enable/promote bonding between the second functional groups 616 of the ligands grafted to said nanoparticles and the polymeric and/or oligomeric brush 612 associated with the upper surface of the substrate 608. Any unbound material (e.g., grafted nanoparticles 602 not attached to the substrate 608) may be removed by rinsing the substrate 608 with a suitable solvent.

However, in approaches aimed at forming a near monolayer of nanoparticles, controlling the thickness of the deposited film of grafted nanoparticles 602 (each of which include polymer and/or oligomer ligands that do not have the second functional groups configured to attach to the substrate 608) may be sufficient to produce a film with ≥80% nanoparticle coverage, ≤20% presence of a double layer of nanoparticles, and/or ≤20% of empty holes in a single layer.

As noted above, in preferred approaches, each of the guiding features 610 may be positioned so as to replace a grafted nanoparticle 602, thereby forming an ordered array of alternating guiding features 610 and grafted nanoparticles 602 that are spaced evenly, or substantially evenly, apart.

In some approaches, the width, $w_s$, of each of the guiding features 610 may be about equal to the diameter, $w_o$, of the cores 604 of the grafted nanoparticles 602. In preferred approaches, the diameter of each nanoparticle core 604 may be in a range between about 1 nm to about 15 nm. In more approaches, the width, $w_s$, of each of the guiding features 610 may be about equal to or less than the outer edge-to-outer edge distance, $L_x$, between a grafted nanoparticle 602 and an adjacent guiding feature 610 ($w_s \leq L_x$).

In yet more approaches, the pitch, (i.e., center to center spacing), $L_s$, between guiding features 610 is about equal to or greater than the pitch, $L_y$, between a grafted nanoparticle 602 and an adjacent guiding feature 610 ($L_s \geq L_y$). In preferred approaches, the pitch, $L_y$, between a grafted nanoparticle 602 and an adjacent guiding feature 610 may be in a range from about 5 to about 15 nm. Moreover, as each guiding features 610 may preferably serve as a substitute for a grafted nanoparticle 602, the pitch, $L_s$, between guiding features 610 may be about equal to or greater than the shortest lattice plane spacing, $d_x$, associated with the lattice of alternating guiding features 610 and grafted nanoparticles 602 ($L_s \geq d_y$).

In approaches where a high degree of ordering in the grafted nanoparticles 204 is desired, then a commensurability relationship between the guiding features 610 and the self-assembled lattice/pattern of grafted nanoparticles 602 may need to be maintained. For instance, the guiding features 610 may be commensurate with the periodicity of the nanoparticle assembly when $L_s \approx nL_y$ and/or $L_s \approx nd_y$, where n is an integer greater than 1.

In additional approaches, the height, $t_s$, of each of the guiding features 610 may be about equal to the height, to, of the monolayer 614 of grafted nanoparticles 602 ($t_s \approx t_o$). However, in other approaches, the height, $t_s$, of each of the guiding features 610 may be greater than or less than the height, $t_o$, of the monolayer 614 of grafted nanoparticles 602, depending on the application.

In some approaches, the length of the guiding features 610 may be about equal to the length of the substrate 608, thereby forming an array of stripes (see e.g., FIG. 2B). In approaches where the guiding features 610 have a pillar shape, the length and/or width of the guiding features 610 may be about equal to $w_o$ and/or about equal to or less than $L_x$. Likewise, in approaches where the guiding features are dots, the diameter of each of the dots may preferably be about equal to $w_o$ and/or about equal to or less than $L_x$.

Chemical Contrast Guiding

Similar to the topographic guiding techniques discussed above, chemical contrast guiding may also be used to direct the self-assembly of nanoparticles deposited on a substrate.

Figure 7:
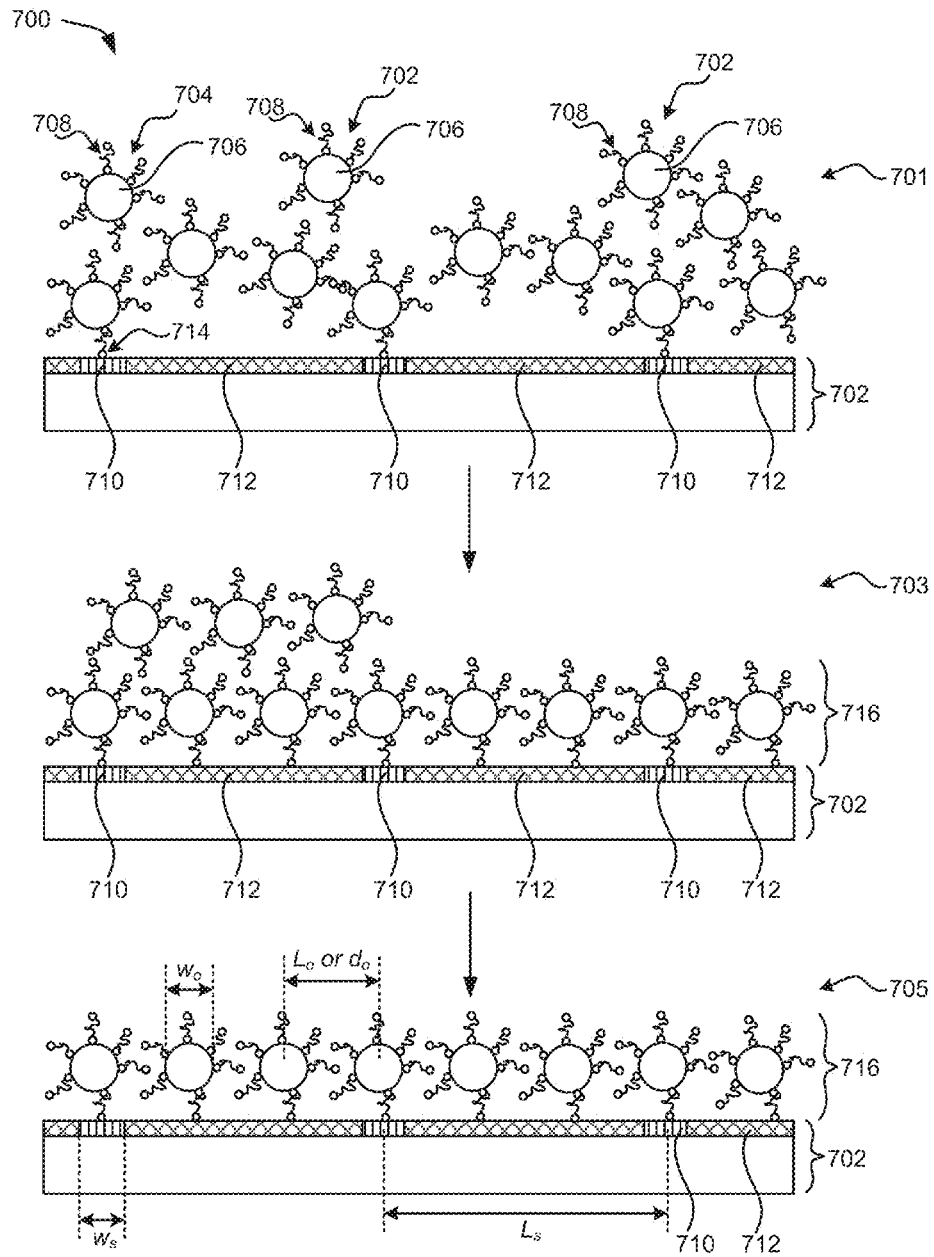
FIG. 7 is a flowchart of a method for forming a self-terminating monolayer of self-assembling nanoparticles via chemical contrast guiding, according to one embodiment.

FIG. 7 provides an exemplary method for forming a self-terminating monolayer or a near monolayer of nanoparticles via chemical contrast guiding, according to one embodiment. As an option, the present method 700 may be implemented in conjunction with features from any other embodiment listed herein, such as those described with reference to the other FIGS. Of course, this method 700 and others presented herein may be used to form structures for a wide variety of devices and/or purposes which may or may not be related to magnetic recording. It should be noted that the method 700 may include more or less steps than those described and/or illustrated in FIG. 7, according to various embodiments. It should also be noted that that the method 700 may be carried out in any desired environment. For example, some or all of steps associated with the method 700 may be carried out under vacuum (e.g. in a vacuum reaction chamber). Further, while exemplary processing techniques (e.g. deposition techniques, etching techniques, polishing techniques, etc.) are presented, other known processing techniques may be used for various steps.

As shown in FIG. 7, the method 700 includes providing a substrate 702 and depositing a plurality of grafted nanoparticles 704 thereon, where the substrate 702 includes a chemical contrast guiding pattern configured to direct the self-assembly of grafted nanoparticles 704. See structure 701. Each of the plurality of grafted nanoparticles 704 includes a nanoparticle core 706 grafted to one or more polymeric and/or oligomeric ligands 708. It is important to note that the ligands 708 of the grafted nanoparticles 704 that extend out from, and into, the page are not shown for clarity purposes. In some approaches, each of the one or more polymeric and/or oligomeric ligands 708 may have a degree of polymerization in a range between about 5 to about 150.

In various approaches, each of the plurality of grafted nanoparticles 704 may include the same materials, arrangement/structure and/or properties as previously disclosed herein (e.g., as disclosed with reference to structures 101, 103, and 105 of FIG. 1). For example, in particular approaches aimed at forming a self-terminating monolayer of nanoparticles, the grafted nanoparticles 704 may each include one or more ligands 708 having a first functional group configured to bind to their respective nanoparticle core 706 and a second functional group configured to bind to the substrate 702 (but not another nanoparticle core 706 and/or ligand 708). However, in approaches aimed at forming a near monolayer of nanoparticles, the grafted nanoparticles 704 may each include one or more ligands 708 having a first functional group configured to bind to their respective nanoparticle core 706 but not a second functional group configured to bind to the substrate 702. Moreover, in more approaches, the plurality of grafted nanoparticles 704 may be dispersed in a suitable solvent and subsequently deposited on the substrate 702 via spin coating, dip casting, spraying, inkjet printing, or other suitable deposition technique as would be understood by one having skill in the art upon reading the present disclosure.

As also shown in structure 701 of FIG. 7, the chemical contrast guiding pattern on the substrate 702 may include a plurality of pinning regions 710 and a plurality of non-pinning regions 712. The pinning regions 710 may be configured to bind the ligands 708 (and/or a particular functional group in the ligands 708) of the grafted nanoparticles 704. For instance, in various approaches, the pinning regions 710 may include a material that has a chemical and/or wet affinity for the ligands 708 (e.g., particularly the second functional groups 714 of the ligands 708), whereas the non-pinning regions 712 may include a material that does not have a chemical and/or wet affinity for the ligands 708 (or has a reduced affinity for the ligands 708 as compared to the pinning regions 710).

The pinning regions' 710 preferential affinity for the ligands 708 of the grafted nanoparticles 704 may be obtained by various options. In one particular approach, the affinity between the pinning regions 710 and the ligands 708 may be obtained via preferential wetting or enthalpic interactions. For example, in approaches where the ligands 708 include polystyerene, the pinning regions 710 may include a material having a high affinity for polystyrene (PS) such as a polystyrene brush or mat. In such approaches, the non-pinning regions 712 may thus include a material having less favorable interaction with the PS such as a poly-2-vinyl pyridine (P2VP) brush, which is immiscible with PS due to enthalpic interactions; however, the PS can still wet. In other approaches, the ligands 708 may include specific second functional groups 714 that are configured to bind with the material of the pinning regions 710. For example, in one approach, the upper surface of the pinning regions 710 may include one or more oxides (e.g., SiOx, AlOx, etc.), and the ligands 708 may include an —OH second functional group 714, which may readily bind with an oxide surface.

After deposition of the grafted nanoparticles 704 onto the substrate 702, the method 700 may include an optional thermal or solvent annealing step, which may induce/drive the grafted nanoparticle 704 assembly to reach its free energy minimum in the presence of the chemical contrast guiding pattern (i.e., the pattern comprising the pinning regions 710 and non-pinning regions 712). See resulting structure 703. The grafted nanoparticles 704 deposited on the pinning regions 710 may bind thereto, rending these pinned grafted nanoparticles 704 immobile during the annealing process. However, the grafted nanoparticles 704 that are present above and/or on the non-pinning regions 712 may be free to move during the annealing process. Accordingly, the Free energy minimization process during the self-assembly of the grafted nanoparticles 704 may be constrained by the immobilized nanoparticles "pinned" to the surfaces of the pinning regions 710. In various approaches, the annealing parameters, the geometry of the chemical contrast patterns, and/or distribution of the chemical contrast patterns may be tailored to achieve a desired degree of ordering in the monolayer 716 of grafted nanoparticles 704, where the desired ordering may include nearly perfect single crystal arrays or somewhat distorted arrays depending on the level of commensurability between the chemical contrast guiding patterns and the self-assembled nanoparticles.

In approaches aimed at forming a self-terminating monolayer of nanoparticles, after the optional annealing step, the first monolayer 716 of grafted nanoparticles 704 in direct contact with the substrate 702 may be fixed/attached thereto via an activation treatment configured to enable/promote bonding between the second functional groups 714 of the ligands 708 grafted to said nanoparticles and the substrate. Any unbound material (e.g., grafted nanoparticles 704 not attached to the substrate 702) may be removed by rinsing the substrate 702 with a suitable solvent. See resulting structure 705.

In approaches aimed at forming a near monolayer of nanoparticles, controlling the thickness of the deposited film of grafted nanoparticles 704 (each of which include polymer and/or oligomer ligands that do not have the second functional groups configured to attach to the substrate 702) may be sufficient to produce a film with ≥80% nanoparticle coverage, ≤20% presence of a double layer of nanoparticles, and/or ≤20% of empty holes in a single layer.

In some approaches, the width, $w_s$, of each of the pinning regions 710 may be smaller than the pitch, $L_o$, between adjacent self-assembled grafted nanoparticles 704 and/or smaller than the shortest lattice plane spacing, $d_o$, associated with the self-assembled lattice of grafted nanoparticles 704 ($L_s \geq d_o$). In preferred approaches, the width, $w_s$, of each of the pinning regions 710 may be about equal to the diameter, $w_o$, of the nanoparticle cores 706.

In more approaches, the pitch, (i.e., center to center spacing), $L_s$, between pinning regions 710 may be about equal to or greater than the pitch, $L_o$, between adjacent self-assembled grafted nanoparticles 704 ($L_s \geq L_o$). In preferred approaches, the pitch, $L_o$, between adjacent self-assembled grafted nanoparticles 704 may be in a range between about 5 to about 20 nm. In more approaches, the pitch, $L_s$, between pinning regions 710 may be about equal to $d_o$ ($L_s \geq d_o$).

In approaches where a high degree of ordering in the self-assembled grafted nanoparticles 704 is desired, then a commensurability relationship between the pinning regions 710 and the self-assembled lattice/pattern of nanoparticles 704 may need to be maintained. For instance, the pinning regions 710 may be commensurate with the periodicity of the nanoparticle assembly when $L_s \approx nL_o$ and/or $L_s \approx nd_o$, where n is an integer equal to or greater than 1.

In various approaches, the plurality of pinning regions 710 may include an array of stripes, an array of rectangular shapes, an array of rounded shapes, an array of irregular shapes, and/or combinations thereof. For instance, in some approaches, the length of the pinning regions 710 may be about equal to the length of the substrate 702, thereby forming an array of stripes that comprise the "pinning" material (i.e., the material configured to bind the ligands 708 grafted to the nanoparticle cores 706). In approaches where the pinning regions 710 may have a rectangular shape, the length and/or the width of the pinning regions may preferably be less than $d_o$ and/or about equal to $w_o$. Likewise, in approaches where the pinning regions 710 are circular, the diameter of each of the circular pinning regions may preferably be less than $d_o$ and/or about equal to $w_o$.

In yet more approaches, the method 700 may include forming the chemical contrast patterns on the substrate 702 prior to the deposition of the grafted nanoparticles 704. For instance, the chemical contrast guiding patterns on the substrate 702 may be formed by e-beam lithography, photolithography, nanoimprint lithography, and/or other patterning methods as would be understood by one having skill in the art upon reading the present disclosure.

Figure 8:
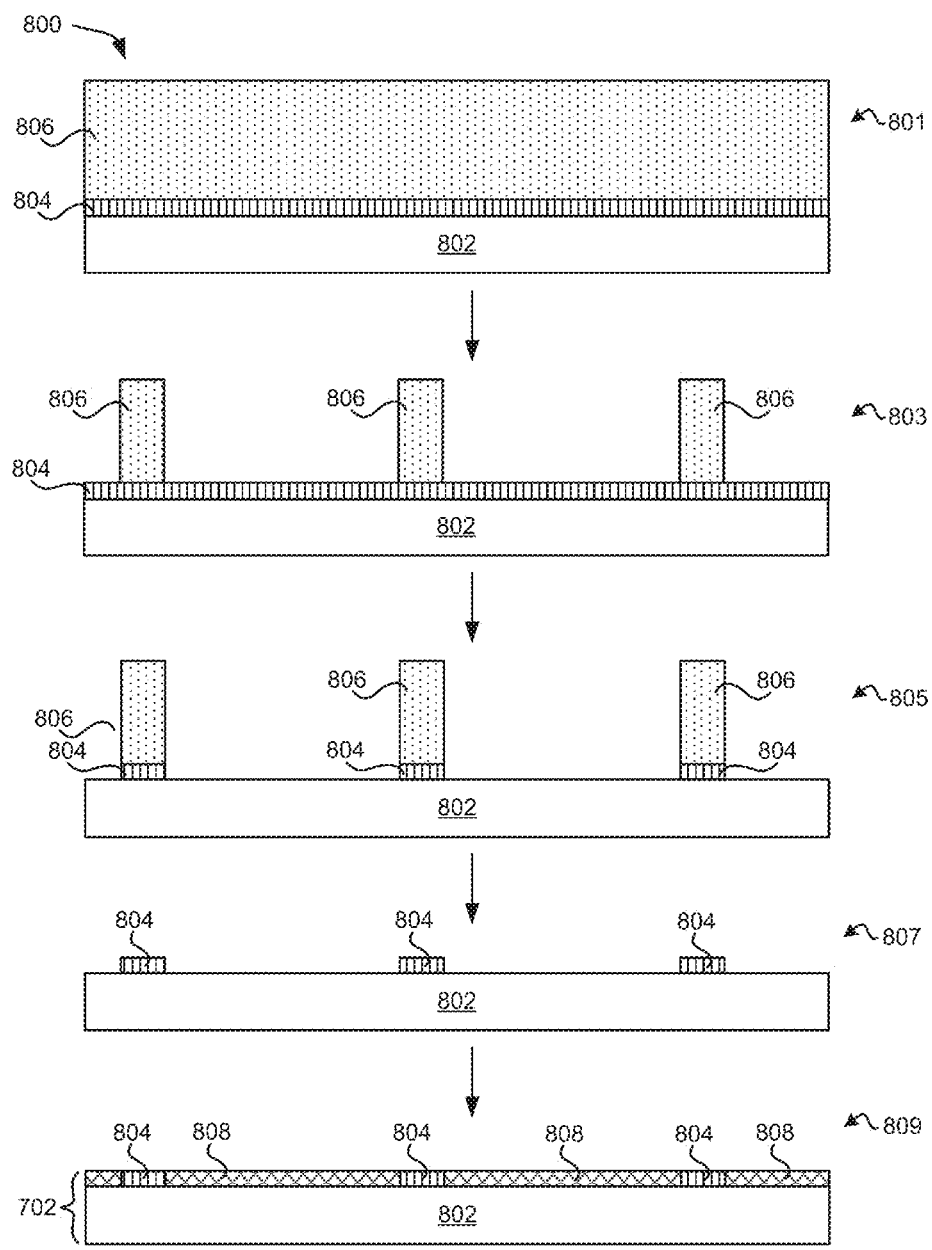
FIG. 8 is a flowchart of a method for forming chemical contrast guiding patterns, according to one embodiment.

FIG. 8 illustrates an exemplary method 800 for forming the chemical contrast guiding patterns (i.e., the pinning regions 710 and non-pinning regions 712) associated with the substrate 702, according to one embodiment. As an option, the method 800 may be implemented in conjunction with features from any other embodiment listed herein, such as those described with reference to the other FIGS. It should be noted that the method 800 may include more or less steps than those described and/or illustrated in FIG. 8, according to various approaches. It should also be noted that that the method 800 may be carried out in any desired environment. For example, some or all of steps associated with the method 800 may be carried out under vacuum (e.g., in a vacuum reaction chamber).

As shown in FIG. 8, the method 800 includes depositing a first surface modification layer 804 above a substrate material 802, and a resist layer 806 above the first surface modification layer 804. See structure 801. In various approaches, the first surface modification layer 804 may include a polymer brush monolayer, a polymer mat, and/or a monolayer of a self-assembling material. In more approaches, the first surface modification layer 804 may include a material that has a chemical and/or wet affinity for the ligands 708 (or specific functional groups therein) of the grafted nanoparticles 704. In yet more approaches, the resist layer 806 may include an e-beam resist material, a photoresist material, an imprint resist material, or other suitable resist material as would be understood by one having skill in the art upon reading the present disclosure.

As also shown in FIG. 8, depending on the particular lithography process utilized (e.g., photolithography, e-beam lithography, nanoimprint lithography etc.), a pattern may be exposed (or imprinted) on the resist layer 806 and developed, resulting in structure 803. Exposed portions of the first surface modification layer 804 may then be etched away via any known dry or wet etch process, resulting in structure 805. The resist layer 806 may then be removed, leaving raised pinning regions comprising the first surface modification layer 804. See resulting structure 807.

Regions where the substrate material 802 is exposed may optionally be backfilled with a second surface modification layer 808, thereby forming non-pinning regions comprised of the second surface modification layer 808. See resulting structure 809. As shown in structure 809, the upper surface of the second surface modification layer 808 may about equal to the upper surface of the raised pinning regions. However, in some approaches, the upper surface of the second surface modification layer 808 may be below the upper surface of the raised pinning regions.

In various approaches, the optional second surface modification layer 808 may include a polymer brush monolayer, a polymer mat, and/or a monolayer of a self-assembling material that is configured to bind to the exposed portions of the substrate material 802 but not to the first surface modification layer 804. Moreover, the optional second surface modification layer 808 may include a material that does not have a chemical and/or wet affinity for the ligands 708 (or functional groups therein) of the grafted nanoparticles 704, or has a reduced affinity for the ligands 708 and their associated functional groups, as compared to the material of the first surface modification layer 804. In approaches where the upper surface of the optional second surface modification layer 808 is below the upper surface of the raised pinning region comprising the first surface modification layer 804, which may have a chemical or wet affinity for the ligands 708 (or functional groups therein) of the grafted nanoparticles 704, and where the second surface modification layer 808 has no such affinity for said ligands 708 (or functional groups therein), the self-assembly of deposited grafted nanoparticles 704 may occur via topographic and chemical contrast guiding.

It is important to note that in some approaches, the method 800 may not include backfilling the exposed portions of the substrate material 802 with the second surface modification layer 808. In such approaches, the resulting substrate may include raised pinning portions comprising the first surface modification layer 804, which may have a chemical or wet affinity for the ligands 708 (or functional groups therein) of the grafted nanoparticles 704. In particular approaches where the exposed substrate material 802 has no affinity for the ligands 708 (or functional groups therein) of the grafted nanoparticles 704 (or has a reduced affinity relative to the raised pinning regions), the self-assembly of deposited grafted nanoparticles 704 may occur via topographic and chemical contrast guiding.

It is also important to note that in additional approaches, the method 800 may not include depositing the first surface modification layer 804 above the substrate 802. In such approaches, the resist layer 806 may be deposited directly on the substrate 802. Again depending on the particular lithography process utilized (e.g., photolithography, e-beam lithography, nanoimprint lithography etc.), a pattern may be exposed (or imprinted) on the resist layer 806 and developed, resulting in a structure similar to that of structure 803, except without the first modification layer 804. Exposed portions of the surface of the substrate 802 may then be etched away via any known dry or wet etch process, leaving raised and recessed regions of the substrate 802. In one particular approach, the optional second surface modification layer 808 may be deposited in the recessed regions such that the upper surface of the second modification layer 808 may be about equal to or below the upper surface of the raised regions of the substrate 802. In approaches where the upper surfaces of the second modification layer 808 and the raised regions of the substrate 802 are about equal, and where the substrate 802 material has a preferential affinity for the ligands 708 of the grafted nanoparticles 704 whereas the second surface modification layer 808 has no such affinity (or vice versa), the self-assembly of deposited grafted nanoparticles 704 may occur via chemical contrast guiding. In approaches where the upper surfaces of the second modification layer 808 and the raised regions of the substrate 802 are not equal, and where the substrate 802 material has a preferential affinity for the ligands 708 of the grafted nanoparticles 704 whereas the second surface modification layer 808 has no such affinity (or vice versa), the self-assembly of deposited grafted nanoparticles 704 may occur via topographic and chemical contrast guiding.

Degree of Ordering

The methods described herein for forming a self-terminating monolayer or near monolayer of nanoparticles via directed self-assembly may each be tailored to achieve a desired degree of ordering in the nanoparticle monolayer. As used herein, short range order in nanoparticle monolayers may refer to a correlation length below or equal to $100L_o$, where $L_o$ corresponds to the nanoparticle pitch. Long range order in nanoparticles may thus refer to a correlation length greater than $100L_o$.

Figure 9:
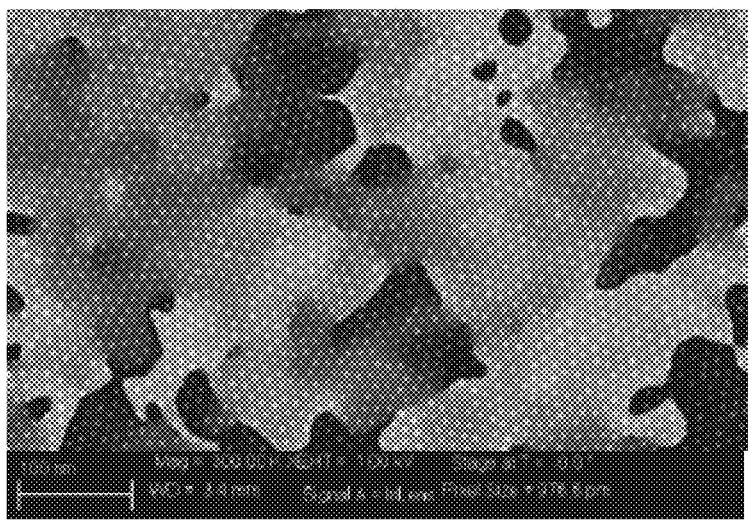
FIG. 9 is a representation of "polycrystalline" ("multi-raft") ordering, according to one embodiment.

In some approaches, the directed self-assembly methods described herein may be used to achieve "polycrystalline" ("multi-raft") ordering characterized by short range orientational and translational order in the nanoparticle monolayer. With polycrystalline ("multi-raft") ordering, the nanoparticles may assemble in multiple "crystallite" or "raft" arrangements each of which include a periodic assembly (e.g., hexagonal close packing). Moreover, each "crystallite" or "raft" may display a different lattice orientation. The purpose of inducing this type of polycrystalline (multi-raft) ordering by using a guiding template (e.g., a substrate) with a topographic and/or chemical contrast pattern thereon is to control the nanoparticle pitch distribution (i.e., the distribution of $L_o$) and to tune the raft size, raft shape and raft size distribution. To induce polycrystalline (multi-raft) ordering, the guiding pattern on the substrate may be polycrystalline itself, periodic, or single-crystalline but otherwise incommensurate to the nanoparticle pitch. FIG. 9 illustrates one example of polycrystalline ("multi-raft") ordering, where each crystallite or "raft" has been shaded with a different gray tone.

Figure 10:
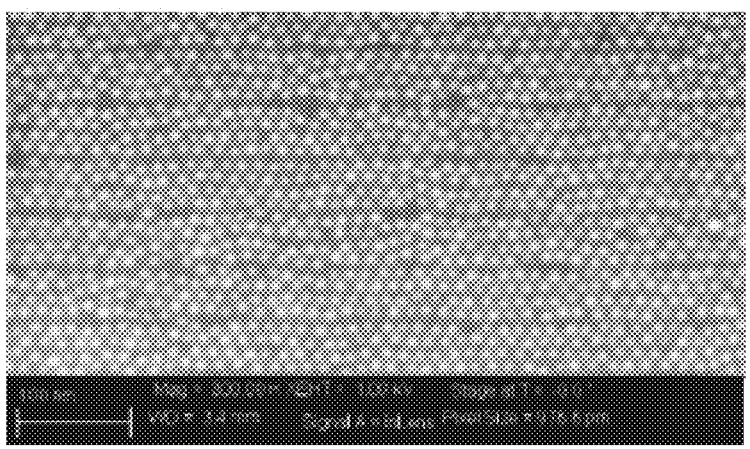
FIG. 10 is a representation of "single raft" ordering, according to one embodiment.

In other approaches, the directed self-assembly methods described herein may be used to achieve "single raft" ordering characterized by long range orientational order and short range translational order in the nanoparticle monolayer. With single raft ordering, the nanoparticles may assemble in a periodic array (e.g., an hcp array having a single orientation, but not necessarily long range translation). A nanoparticle monolayer exhibiting single raft ordering may have line and/or point defects such as dislocations, missing features and/or a general loss of phase translation. Moreover, a nanoparticle monolayer exhibiting single raft ordering may also lack registration to other features. To induce single raft ordering, the guiding template (e.g., the substrate) may include of an array of guiding features (e.g., stripes, dashes, pillar structures, spheres, pinning regions, etc.), where the pitch between the guiding features, $L_s$, is approximately/about commensurate to the lattice plane spacing, do, in the nanoparticle monolayer ($L_s \approx nd_o$, where n is an integer equal or greater than 1). FIG. 10 illustrates one example of "single raft" ordering.

Figure 11:
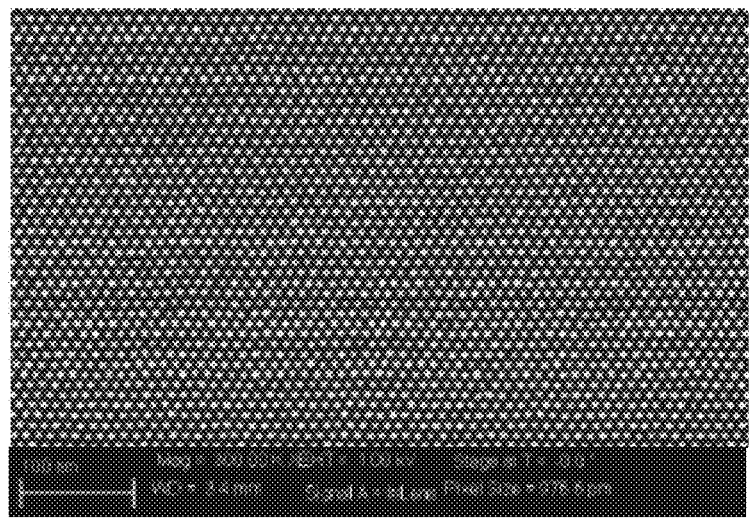
FIG. 11 is a representation of "single raft with translation" ordering, according to on embodiment.

In yet other approaches, the directed self-assembly methods described herein may be used to achieve "single raft with translation" ordering characterized by long range "orientational" and "translational" order. With single raft with translation ordering, the nanoparticles may assemble in a periodic array (e.g., an hcp array with a single orientation and long range translational order). A nanoparticle monolayer exhibiting single raft with translational ordering may have a minimal number of defects (e.g., as compared to single raft ordering) and may display registration to other existing features. To induce single raft with translation ordering, the guiding template (e.g., the substrate) may include a two-dimensional array of guiding features at locations that are commensurate to the nanoparticle assembly ($\vec{a}_s \approx n_1 \vec{a}_o + m_1 \vec{b}_o$ and $\vec{b}_s \approx n_2 \vec{a}_o + m_2 \vec{b}_o$, where $\vec{a}_s$ and $\vec{b}_s$ are lattice vectors for the array of guiding features, and $\vec{a}_o$ and $\vec{b}_o$ are the lattice vectors associated with the nanoparticle assembly). FIG. 11 illustrates one example of "single raft with translation" ordering.

It is important to note that any of the topographic and/or chemical contrast guiding methods may be combined to render more complex nanoparticle assemblies depending on the application. For example, a magnetic recording bit patterned media application requiring patterns to be aligned along circumferential tracks with constant angular pitch may be constructed using guiding patterns on circumferential tracks that slightly distort the hexagonal lattice of the nanocrystals to display translational order along circumferential tracks instead of along straight lines.

Pattern Transfer Using a Self-Terminating Monolayer of Nanoparticles

Depending on the application, the guiding patterns formed by the directed self-assembly of a monolayer of nanoparticles may be readily used as seed layers to grow other functional materials deposited thereabove (such as a granular magnetic recording layer for magnetic recording applications) or, alternatively, said guiding patterns may be used as lithographic masks for pattern transfer to other materials.

Figure 12A:
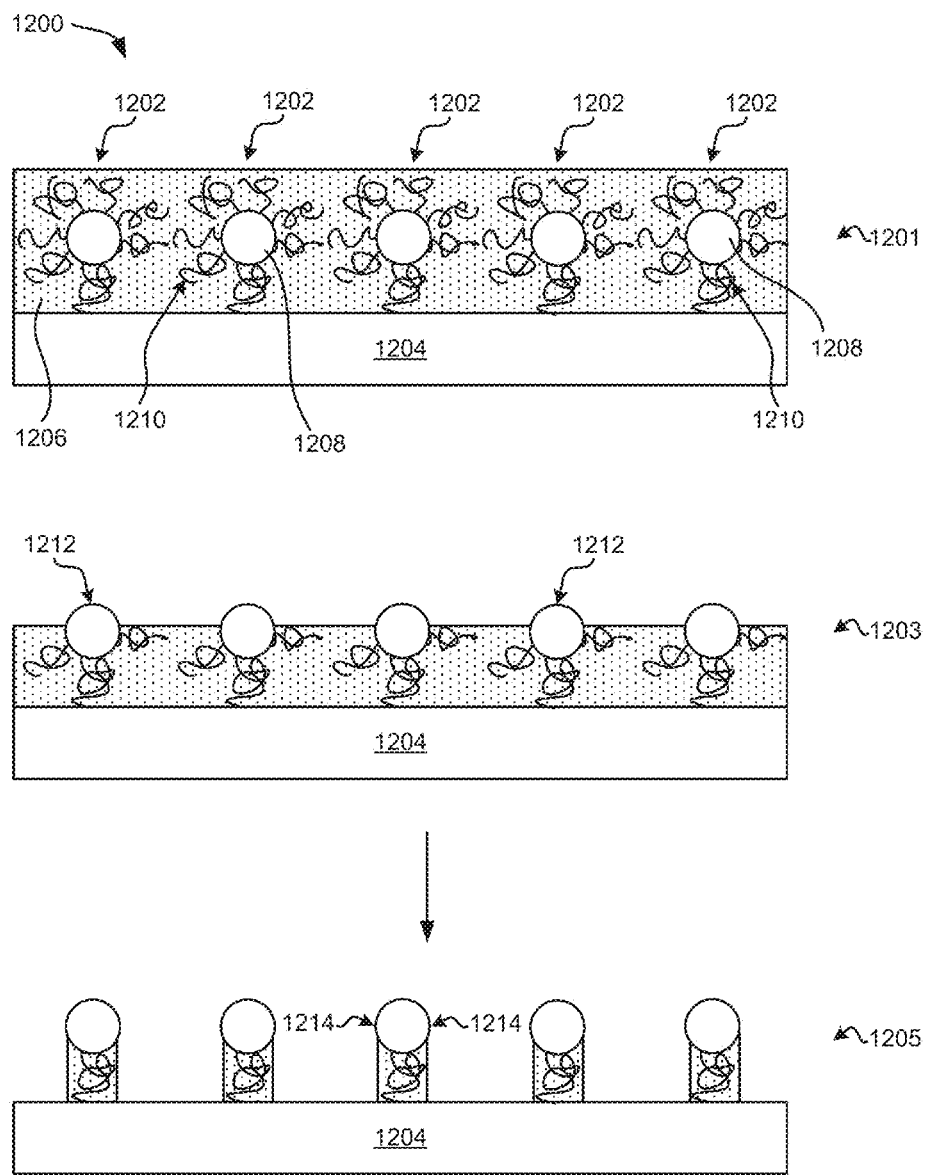
FIG. 12A is a flowchart of a method for performing pattern transfer using a self-terminating monolayer of self-assembling nanoparticles, according to one embodiment.

FIG. 12A illustrates a method 1200 for performing pattern transfer using a self-terminating monolayer of self-assembling nanoparticles, according to one embodiment. It is important to note that the method 1200 for performing pattern transfer is not limited to the use of a self-terminating monolayer of self-assembling nanoparticles, but is merely shown in FIG. 12A for purposes of clarity/simplicity. For example, in some approaches the method 1200 for performing pattern transfer may utilize a near monolayer of nanoparticles, where each nanoparticle is grafted to one or more polymer and/or oligomer ligands that have a first functional group configured to bind their respective nanoparticle core but not a second functional group configured to bind to a substrate.

Figure 12A:
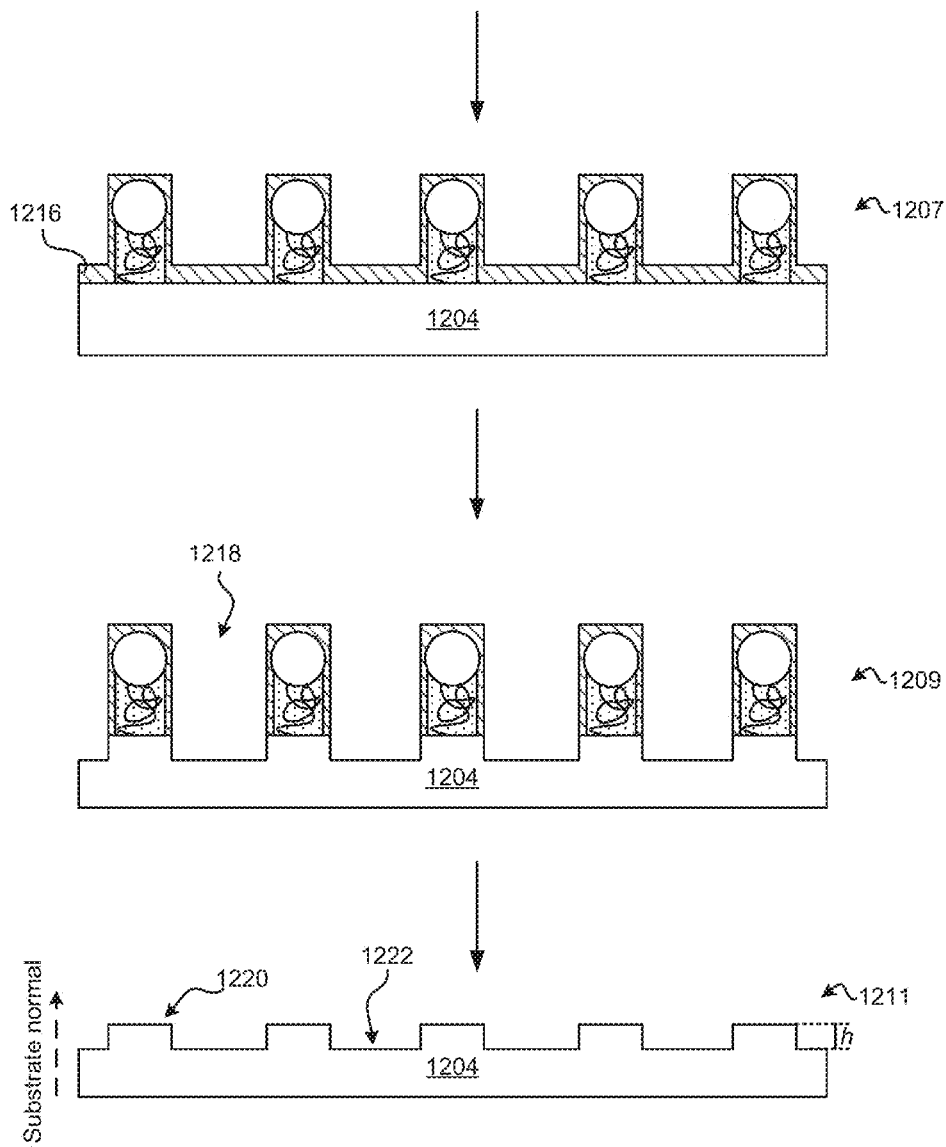

As an option, the present method 1200 may be implemented in conjunction with features from any other embodiment listed herein, such as those described with reference to the other FIGS. Of course, this method 1200 and others presented herein may be used to form structures for a wide variety of devices and/or purposes which may or may not be related to magnetic recording. It should be noted that the method 1200 may include more or less steps than those described and/or illustrated in FIG. 12, according to various embodiments. It should also be noted that that the method 1200 may be carried out in any desired environment. For example, some or all of steps associated with the method 1200 may be carried out under vacuum (e.g. in a vacuum reaction chamber). Further, while exemplary processing techniques (e.g. deposition techniques, etching techniques, polishing techniques, etc.) are presented, other known processing techniques may be used for various steps.

As shown in FIG. 12A, a self-terminating monolayer of grafted nanoparticles 1202 is formed on a substrate 1204 via self-assembly. See structure 1201. In some approaches, the substrate 1204 may include at least one of a metal, a dielectric material and a semiconductor material.

The grafted nanoparticles 1202 are coupled to a polymer and/or oligomer matrix 1206. In particular, each of the plurality of grafted nanoparticles 1202 includes a nanoparticle core 1208 grafted to one or more polymeric and/or oligomeric ligands 1210. It is important to note that the ligands 1210 of the grafted nanoparticles 1202 that extend out from, and into, the page are not shown for clarity purposes.

In various approaches, each of the plurality of grafted nanoparticles 1202 may include the same materials, arrangement/structure and/or properties as previously disclosed herein (e.g., as disclosed with reference to structures 101, 103, and 105 of FIG. 1). Additionally, the monolayer of grafted nanoparticles 1202 may be formed by any of the methods disclosed herein (e.g., the methods described in FIGS. 1-8). In preferred approaches, the monolayer of grafted nanoparticles 1202 may be formed via directed self-assembly, where the substrate 1204 includes shallow topographic guiding features, tall topographic guiding features, and/or chemical contrast patterns (not shown in FIG. 12A) to direct the self-assembly of the nanoparticles 1202.

In some embodiments, the grafted nanoparticle assemblies may be used as a seed layer to direct the growth of functional materials deposited thereabove. Formation of such a seed layer may require removing portions of the polymer and/or oligomer matrix 1206 via a known etching technique to expose at least the top/upper surface 1212 of the nanoparticle cores 1208. The extent to which the polymer and/or oligomer matrix 1206 is removed may be tailored to a particular application.

For instance, in one particular approach, the polymer and/or oligomer matrix 1206 may be partially etched (e.g., via a dry etching technique) to remove ligands 1210 grafted to the top/upper surface 1212 of the nanoparticle cores 1208. See structure 1203. In some approaches where the polymer and/or oligomer matrix 1206 may be partially etched to produce structure 1203, the remaining monolayer of grafted nanoparticles 1202 may serve as a seed layer to template or nucleate the growth of additional materials deposited thereon. For instance, additional materials deposited above structure 1203 may have crystalline grains or islands in registry with the nucleation regions of the resulting seed layer (e.g., the exposed top/upper surfaces 1212 of the nanoparticle cores 1208). By purposefully selecting the size of the grafted nanoparticles, as well as the location and/or order of said nanoparticles in the monolayer (e.g., using particular functionalized ligands, varying annealing conditions, and/or using topographic and/or chemical contrast guiding), the distribution in size and/or location of crystalline grains in the overlying layers may be controlled.

In another particular approach, the polymer and/or oligomer matrix 1206 may be fully etched (e.g., via a dry etching technique) to remove ligands 1210 grafted to the top/upper surface 1212 and the side surfaces 1214 of the nanoparticle cores 1208. See structure 1205. Note that in a full etch step, the ligands 1210 grafted to the bottom surfaces of the nanoparticle cores 1208 (and which bind the grafted nanoparticle 1202 to the substrate 1204) may remain. In various approaches where the polymer and/or oligomer matrix 1206 may be fully etched to produce structure 1205, the remaining monolayer of grafted nanoparticles 1202 may serve as a seed layer to template or nucleate the growth of additional materials deposited thereon.

In other embodiments, the grafted nanoparticle assemblies (see structure 1205) may be used as an etch mask to transfer the pattern formed from the self-assembled nanoparticles to the substrate 1204 and/or other underlying layers. For instance, after the polymer and/or oligomer matrix 1206 has been fully etched (see structure 1205), a conformal protective layer 1216 may be deposited above the remaining monolayer of grafted nanoparticles 1202, in various approaches. See structure 1207. The conformal protective layer 1216 may include at least one of: Si, SiOx, SiN, AlOx, Cr, W, Mo, C, Al, and other such suitable materials as would be understood by one having skill in the art upon reading the present disclosure. The conformal protective layer 1216 may be deposited via atomic layer deposition (ALD), chemical vapor deposition (CVD), evaporation, e-beam evaporation, ion beam deposition, sputtering, or other known deposition technique. In preferred approaches, the conformal protective layer 1216 has a thickness in a range between about 5 Å to about 50 Å.

After deposition of the conformal protective layer 1216, the method 1200 may include an etching step to remove portions of materials present in the cavity regions 1218 between the grafted nanoparticles 1202, such as portions of the conformal protective layer 1216 and/or portions of the substrate 1204 present in said cavity regions 1218, according to more approaches. See structure 1209. For example, in one approach, a first anisotropic reactive etch process may be used to remove the conformal protective layer 1216 present in the cavity regions 1218 (e.g., the portions of the conformal protective layer 1216 deposited on the upper surface of the substrate 1204). This first reactive ion etching step may also be used to remove portions of the substrate present in the cavity regions 1218, or a subsequent second reactive ion etching step may be used to etch into, and transfer the pattern to, the substrate 1204.

As discussed previously, the substrate 1204 may include a plurality of guiding features (e.g., topographic and/or chemical contrast features) configured to direct the self-assembly of the grafted nanoparticles 1202 on the substrate 1204. In approaches where the guiding features may include the same material as the substrate 1204, the etching step may remove and portions of the substrate 1202 and the guiding features present in the cavity regions 1218. In particular, it may be preferable to etch away the guiding features in approaches directed to shallow interstitial guiding (i.e., in approaches where the substrate includes shallow topographic features). However, in approaches directed to taller substitution guiding (e.g., where the substrate includes tall topographic guiding features that occupy the place of a nanoparticle), it may be preferable for the tall topographic features to be comprised of a material that does not etch during the etching step to remove the protective layer 1216 and/or portions of the substrate 1204 present in the cavity regions 1218.

In further approaches, the remaining monolayer of grafted nanoparticles 1202 and the remaining conformal protective layer 1216 deposited thereabove may be removed, thereby leaving the substrate 1204 with the guiding pattern transferred thereto. See structure 1211. In some approaches, the resulting structure may be 1211 may be used as a nanoimprint stamp/template.

Figure 12B:
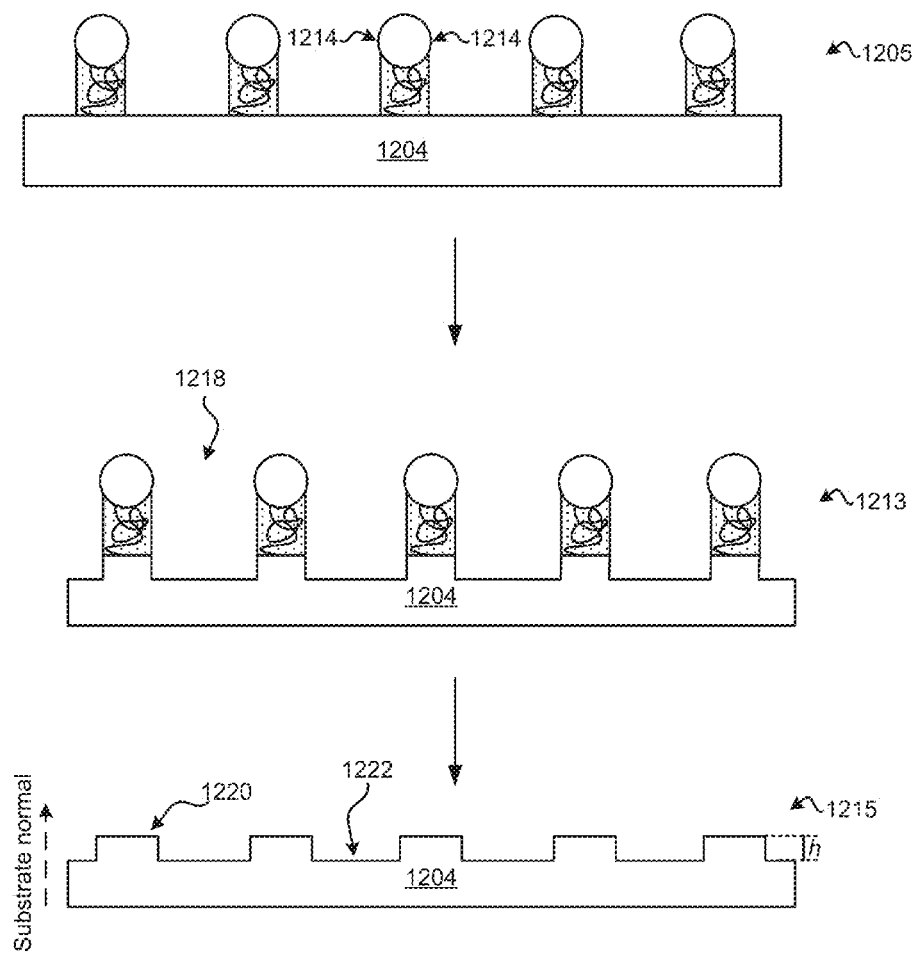
FIG. 12B is a flowchart of a method for performing pattern transfer using a self-terminating monolayer of self-assembling nanoparticles, according to one embodiment.

It is important to note that in the grafted nanoparticle assemblies (see structure 1205 of FIG. 12A) without the conformal protective layer 1216 deposited thereon may be used as an etch mask to transfer the pattern formed from the self-assembled nanoparticles to the substrate 1204 and/or other underlying layers, as shown in the embodiment depicted in FIG. 12B. For instance, as shown in FIG. 12B, the method 1200 may include an etching step (e.g., a reactive ion etch step) to remove portions of materials present in the cavity regions 1218 between the grafted nanoparticles 1202, such as portions of the substrate 1204 and any guiding features susceptible to the etching process present in said cavity regions 1218. See structure 1213. The remaining monolayer of grafted nanoparticles 1202 may then be removed, thereby leaving the substrate 1204 with the guiding pattern transferred thereto. See structure 1215. In some approaches, the resulting structure may be 1215 may be used as a nanoimprint stamp/template.

With continued reference to FIG. 12A, in yet more approaches, one or more layers may be deposited above structure 1211. In particular approaches, the raised features 1220 of structure 1211 may serve as nucleation sites to direct the growth of crystalline grains in granular layers deposited above structure 1211. In some approaches, the substrate 1204 may include a material of high crystallographic order having a specific axis oriented substantially along the axis perpendicular to the upper surface of the substrate. The axis perpendicular to the upper surface of the substrate may also be referred to as the substrate normal. For example, in particular approaches, the substrate 1204 may include an hcp material having its c axis oriented substantially parallel to the substrate normal.

In additional approaches, the substrate 1204 may include a material that oxidizes when exposed to air or a process gas. Accordingly, in such approaches, all exposed regions of structure 1211 may be oxidized when exposed to air or the process gas, resulting in nucleation sites (raised features 1220 of structure 1211) and non-nucleation sites (recessed areas 1222 of structure 1211) having the same oxidized material with the same surface free energy. However, in more approaches, the tops of the raised features 1220 may be cleaned/polished (e.g., via plasma etching or other known thin film cleaning process) in a non-oxidizing atmosphere (e.g. under vacuum) to reveal non-oxidized material, which will have a different surface free energy than the oxidized material of the non-nucleation sites (recessed areas 1222), thus creating chemical contrast.

In other approaches, a second material having a different surface free energy than the material of the substrate 1204 may be deposited in the recessed areas 1222 of structure 1211. The thickness of the second material may be equal to or less than the height, h, of raised features 1220 of structure 1211. The difference in the surface energy of the substrate 1204 material and the second material may therefor create chemical contrast. In approaches where the thickness of the second material is less than the height, h, of the raised features 1220, there may thus be both topographic contrast and chemical contrast between the raised features 1222 (the nucleation regions) and the recessed areas 1222 (the non-nucleation regions).

Figure 13:
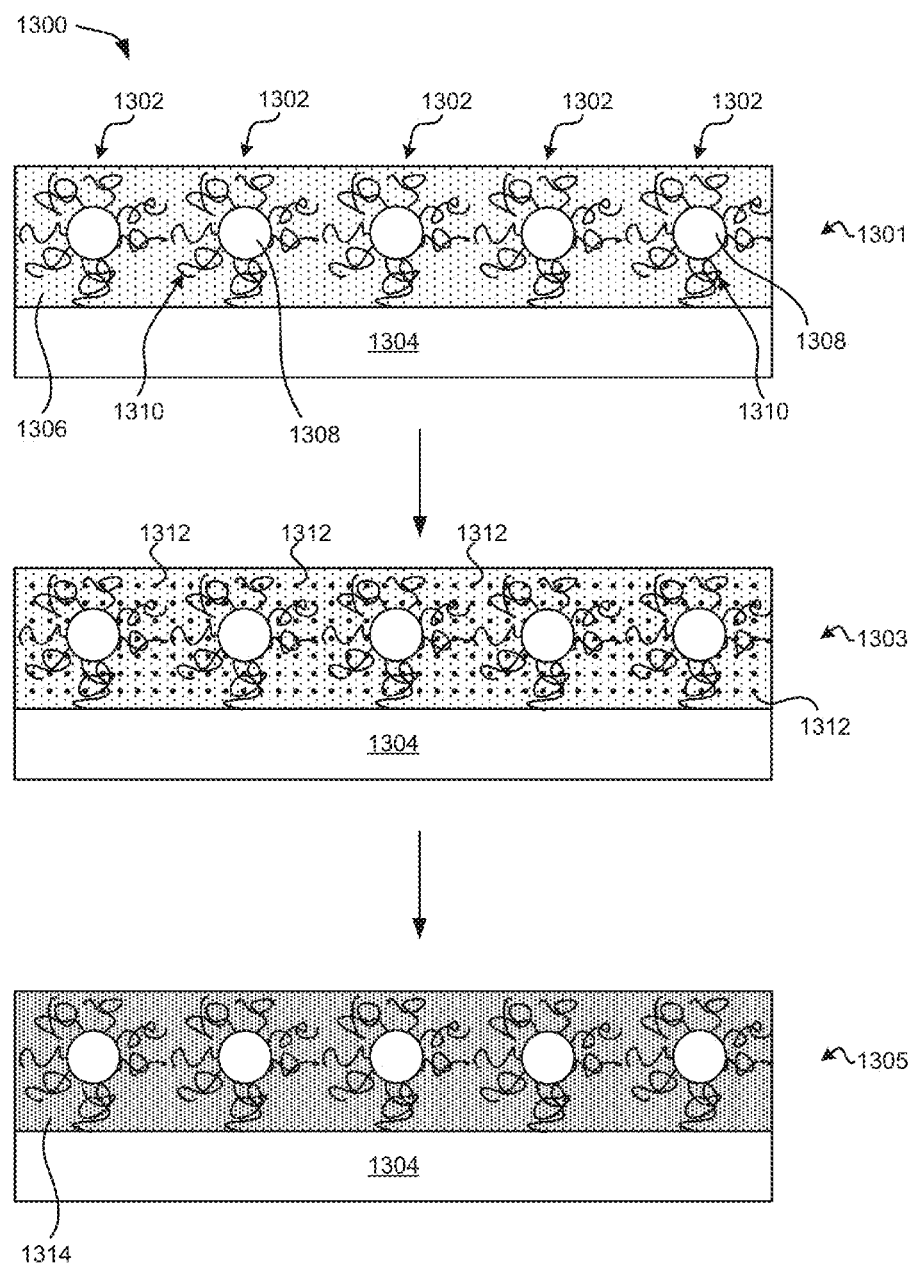
FIG. 13 is a flowchart of a method for performing pattern transfer using a self-terminating monolayer of self-assembling nanoparticles, according to one embodiment.
Figure 13:
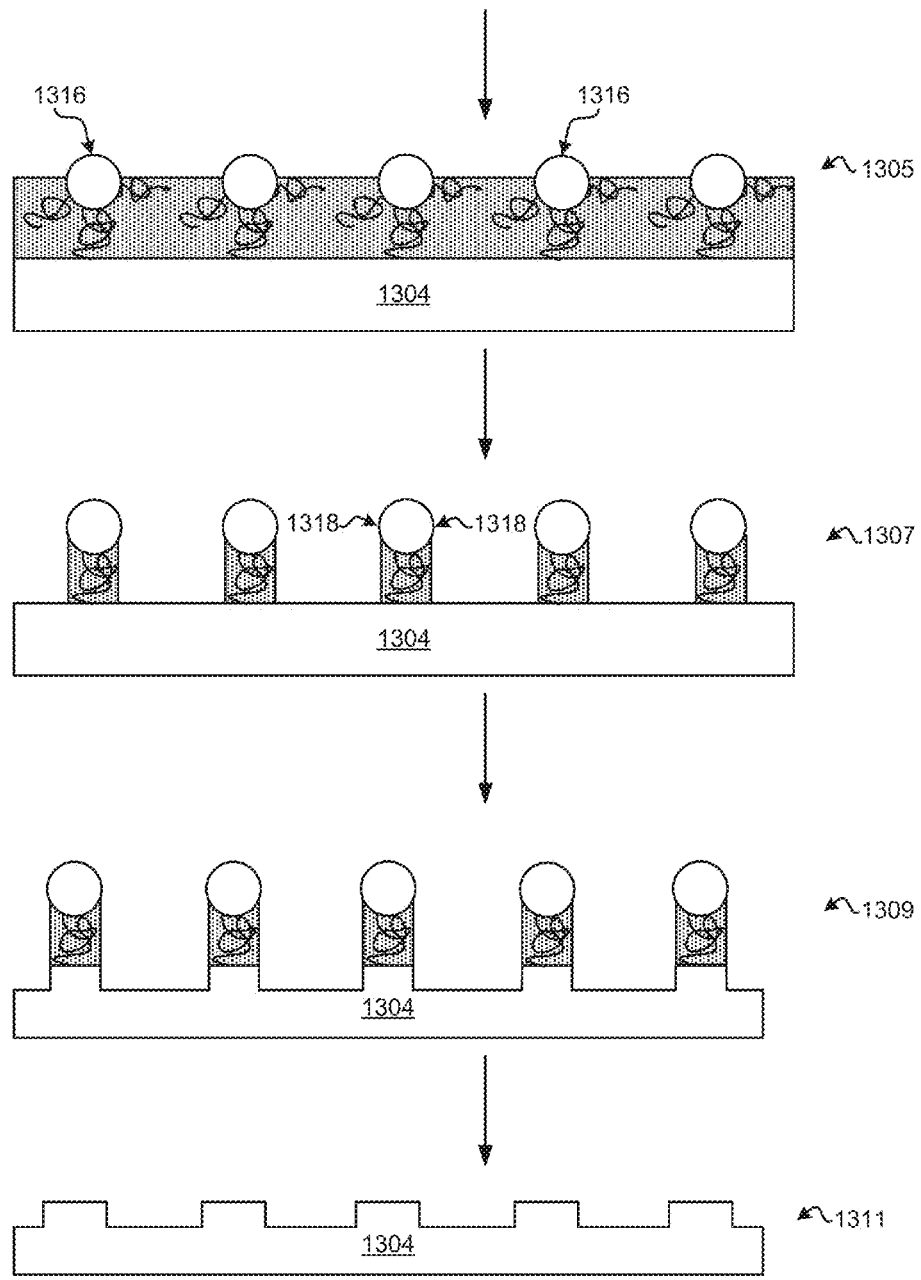

FIG. 13 illustrates a method 1300 for performing pattern transfer using a self-terminating monolayer of self-assembling nanoparticles, according to another embodiment. It is again important to note that the method 1300 for performing pattern transfer is not limited to the use of a self-terminating monolayer of self-assembling nanoparticles, but is merely shown in FIG. 13 for purposes of clarity/simplicity. For example, in some approaches the method 1300 for performing pattern transfer may utilize a near monolayer of nanoparticles, where each nanoparticle is grafted to one or more polymer and/or oligomer ligands that have a first functional group configured to bind their respective nanoparticle core but not a second functional group configured to bind to a substrate.

As an option, the present method 1300 may be implemented in conjunction with features from any other embodiment listed herein, such as those described with reference to the other FIGS. Of course, this method 1300 and others presented herein may be used to form structures for a wide variety of devices and/or purposes which may or may not be related to magnetic recording. It should be noted that the method 1300 may include more or less steps than those described and/or illustrated in FIG. 13, according to various embodiments. It should also be noted that that the method 1300 may be carried out in any desired environment. For example, some or all of steps associated with the method 1300 may be carried out under vacuum (e.g. in a vacuum reaction chamber). Further, while exemplary processing techniques (e.g. deposition techniques, etching techniques, polishing techniques, etc.) are presented, other known processing techniques may be used for various steps.

As shown in FIG. 13, a self-terminating monolayer of grafted nanoparticles 1302 are formed on a substrate 1304 via self-assembly. The grafted nanoparticles 1302 are coupled to a polymer and/or oligomer matrix 1306. In particular, each of the plurality of grafted nanoparticles 1302 includes a nanoparticle core 1308 grafted to one or more polymeric and/or oligomeric ligands 1310. It is important to note that the ligands 1310 of the grafted nanoparticles 1302 that extend out from, and into, the page are not shown for clarity purposes.

In various approaches, each of the plurality of grafted nanoparticles 1302 may include the same materials, arrangement/structure and/or properties as previously disclosed herein (e.g., as disclosed with reference to structures 101, 103, and 105 of FIG. 1). However, in the particular embodiment illustrated in FIG. 10, the polymer and/or oligomer ligands 1310 are configured to react with any of the precursors used in atomic layer deposition (ALD). ALD precursors may include, but are not limited to, polymethyl methacrylate, polylactide, poly-2-vinyl pyridine, poly-4-vinyl pyridine, polyethylene oxide, etc.

Additionally, the monolayer of grafted nanoparticles 1302 may be formed by any of the methods disclosed herein (e.g., the methods described in FIGS. (1-8). In preferred approaches, the monolayer of grafted nanoparticles 1302 may be formed via directed self-assembly, where the substrate 1304 includes shallow topographic guiding features, tall topographic guiding features, and/or chemical contrast patterns (not shown in FIG. 13) to direct the self-assembly of the nanoparticles 1302.

The method 1300 further includes introducing structure 1301 into an ALD chamber, where the monolayer of grafted nanoparticles 1302 may be exposed to a number of cycles of reactant and coreactant to grow an inorganic material 1312 in the polymer and/or oligomer matrix 1306. See structure 1303. For example, in approaches where trimethyl aluminum and water are used as reactant and co-reactant, respectively, aluminum oxide will grow in the polymer and/or oligomer matrix 1306. Other inorganic materials that may be deposited include, but are not limited to, TiOx, SiOx, W, etc.

A dry etch step (e.g., using oxygen or $H_2$—Ar plasma) may then be used to remove the polymer and/or oligomer ligands 1310 present in the polymer and/or oligomer matrix 1306, and to harden the inorganic material 1312, thereby forming a new, hardened inorganic matrix 1314. See structure 1305. A second etch step may be needed to remove the inorganic matrix 1314 present above the top/upper surfaces 1316 and/or the side surfaces 1318 of the nanoparticle cores 1308. See structure 1307. In some approaches, after a desired portion of the inorganic matrix 1314 has been removed, the assembly of nanoparticle cores 1308 in the remaining inorganic matrix 1314 may serve as a seed layer to template or nucleate the growth of additional materials deposited thereon.

In further approaches, a third etching step may be applied using the assembly of nanoparticle cores 1308 as an etch mask to transfer the pattern formed from the self-assembled nanoparticles to the substrate 1304 and/or other underlying layers. See structure 1309. In particular approaches, the substrate 1304 and/or one or more of said underlying layers may include at least one metal, a semiconductor material, and a dielectric material.

In yet more approaches, the assembly of nanoparticle cores 1308 and remaining portions of the inorganic matrix 1314 may be removed, thereby leaving the substrate 1304 with the guiding pattern transferred thereto. See structure 1311. In some approaches, resulting structure may be 1311 may be used as a nanoimprint stamp/template, as a seed layer to direct the growth and/or crystalline orientation of layers deposited thereon, etc.

APPLICATIONS/USES

In various approaches, the methods and resulting structures disclosed herein, which may be used independently or in any combination, and may be particular useful for the formation of magnetic recording media. Magnetic recording media has evolved since it was introduced in the 1950's. Efforts are continually being made to increase areal recording density (i.e., bit density) of the magnetic media. Such efforts, for example, have led to the development of perpendicular recording media (PMR), which have found to be superior to longitudinal recording media. In PMR, the magnetization of the bits is oriented out of the film plane, whereas in longitudinal recording media, the magnetization of the bits is oriented substantially in the film plane.

Areal recording density of the magnetic media may also be increased by improving the magnetic behavior (e.g. distribution of magnetic exchange between grains) and structural distributions (e.g. grain pitch distribution) of the magnetic grains. Accordingly, one approach to improve the magnetic behavior and structural distributions of the magnetic may involve improving the shape and location of the written bit. For instance, in preferred approaches, magnetic recording media may include a seed layer comprising nucleation regions to direct the growth and/or crystalline orientation of the magnetic grains. Typically, magnetic grains in conventional magnetic recording media may begin to grow at nucleation sites that are determined by the statistical nature of the growth of the seed layer on a substrate (e.g. the disk surface). Such growth may lead to several undesirable outcomes such as: a wide distribution of the center-to-center spacing (i.e. the pitch) of the grains, which may lead to unwanted exchange coupling between grains in too close proximity; a wide distribution of grain sizes, where grains with larger sizes are more difficult to write to and add to the write jitter, and grains with smaller sizes are more thermally unstable; and increased roughness of the gain boundaries and thus the edges of the magnetic bits, further contributing to write jitter.

Approaches to control the distribution in grain size and/or location, and thus prevent and/or mitigate these undesirable outcomes may involve purposefully locating the nucleation sites in the seed layer to grow columnar structures for magnetic media and to control the distribution in grain size and/or location. This approach, also referred to as templated growth, may allow for better uniformity in grain pitch and/or grain size, better control over grain-to-grain exchange coupling, etc.

An additional approach to achieving higher areal density in magnetic recording media involves use of patterned recording media. In patterned recording media, the ensemble of magnetic grains that form a bit in PMR are replaced with a single island that is placed a prioiri on the disk, in a location where the write transducer expects to find the bit in order to write information and where the readback transducer expects to detect the information stored thereto. Stated another way, in patterned recording media, the magnetic recording layer on a disk is patterned into isolated magnetic regions in concentric data tracks. To reduce the magnetic moment between the isolated magnetic regions or islands in order to form the pattern, magnetic material is destroyed, removed or its magnetic moment substantially reduced or eliminated, leaving nonmagnetic regions therebetween.

There are two types of patterned magnetic recording media: discrete track media (DTM) and bit patterned media (BPM). For DTM, the isolated magnetic regions form concentric data tracks of magnetic material, where the data tracks are radially separated from one another by concentric grooves of nonmagnetic material. In BPM, the isolated magnetic regions form individual bits or data islands which are isolated from one another by nonmagnetic material. Each bit or data island in BPM includes a single magnetic domain, which may be comprised of a single magnetic grain or a few strongly coupled grains that switch magnetic states in concert as a single magnetic volume.

One approach used to generate BPM may involve depositing a full and continuous film of magnetic material (with appropriate underlayers) above a substrate, and subsequently utilizing a mask (e.g. a lithographic mask) to define the perimeters of magnetic islands via etching beyond the magnetic layers. However, it is increasingly challenging to define the magnetic islands in this way as areal density increases. An additional complication is that as island size decreases, the etch width (and therefore the etch depth) must also decrease in order to maintain a large fill factor of magnetic material in each island. This may constrain the magnetic layer(s) to smaller and smaller total thicknesses. Accordingly, there is a need for an improved means to generate magnetic islands that are purposefully located. Moreover, similar to PMR media, BPM must also achieve sufficient magnetic properties, such as a low intrinsic switching field distribution, that result from high crystallographic orientation.

Various embodiments disclosed herein describe structures particularly suited for use in magnetic recording media, and methods of making the same, which achieve purposefully located magnetic islands and/or high crystallographic orientation, large fill factors of magnetic material in each island, well defined magnetic islands, narrow grain distributions, and desirable magnetic properties with no etching damage on the magnetic recording layer(s). For instance, in various approaches, a monolayer structure comprising patterns of self-assembled nanoparticles may serve as a seed layer to template or nucleate the growth of granular materials deposited thereon. In other approaches, a monolayer structure comprising patterns of self-assembled nanoparticles may serve as an etch mask to transfer the patterns to underlying materials, where the resulting patterned underlying materials may in turn serve as seed layers or nanoimprint templates/stamps. For perpendicular magnetic recording media, the self-assembly of the nanoparticle monolayer may be directed in such a manner so as to produce patterns with "multi-raft" or "single raft" ordering but with limited translational order. Moreover, for bit patterned media, the self-assembly of the nanoparticle monolayer may be directed in such a manner so as to produce patterns with a "single raft with translation" ordering where the nanoparticles follow circular tracks at a constant angular pitch.

Figure 14:
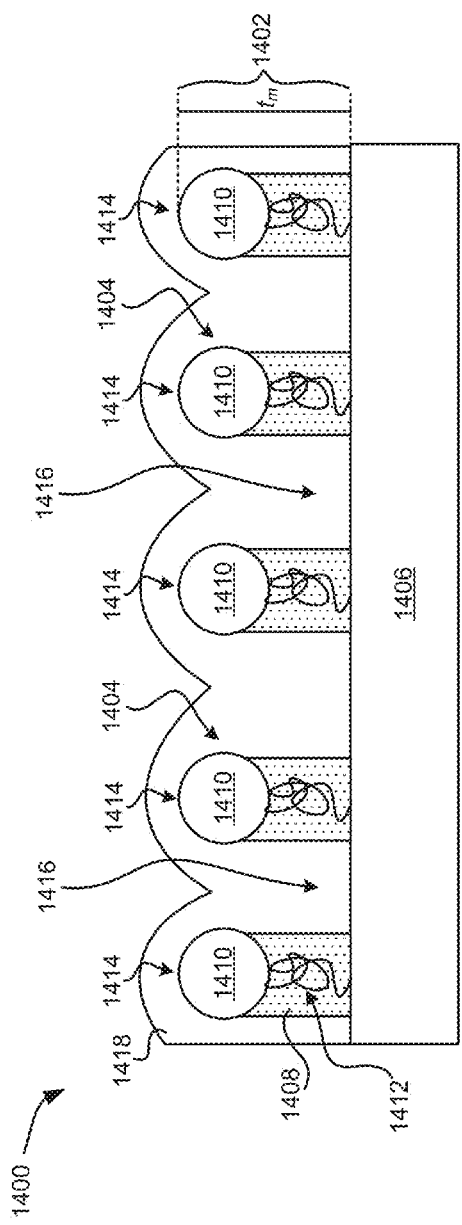
FIG. 14 is a simplified schematic of a magnetic recording medium comprising a monolayer structure of self-assembled nanoparticles, according to one embodiment.

FIG. 14 illustrates a magnetic recording medium 1400 comprising a monolayer structure 1402 of self-assembled nanoparticles 1404, according to one embodiment. As an option, the magnetic recording medium 1400 may be implemented in conjunction with features from any other embodiment listed herein, such as those described with reference to the other FIGS. Of course, the magnetic recording medium 1400 and others presented herein may be used in various applications and/or in permutations which may or may not be specifically described in the illustrative embodiments listed herein. For instance, the magnetic recording medium 1400 may include more or less layers than those shown in FIG. 14, in various approaches. Further more, the magnetic medium 1400 and others presented herein may be used in any desired environment.

As shown in FIG. 14, the structure includes a non-magnetic substrate 1406, which may include glass, ceramic materials, glass/ceramic mixtures, AlMg, silicon, silicon-carbide, or other substrate material suitable for use in magnetic recording media as would be recognized by one having skill in the art upon reading the present disclosure. In various approaches, the substrate 1406 may include guiding features such as those disclosed herein (e.g., tall topographic guiding features, shallow topographic guiding features, and/or chemic contrast patterns) to direct the self-assembly of the nanoparticles 1404 deposited on the substrate 1406.

In one approach, the magnetic recording medium 1400 may include an optional adhesion layer (not shown in FIG. 14) above the substrate 1406 to promote coupling of layers formed thereabove. In other approaches, the magnetic recording medium 1400 may also include one or more optional soft magnetic underlayers (not shown in FIG. 14) positioned above the substrate 1406. The one or more optional soft magnetic underlayers may be configured to promote data recording in a magnetic recording layer positioned thereabove. In particular approaches, the optional soft magnetic underlayer(s) may include a material having a high magnetic permeability. Suitable materials for the soft magnetic underlayer(s) may include, but are not limited to, Fe, FeNi, FeCo, a Fe-based alloy, a FeNi-based alloy, a FeCo-based alloy, Co-based ferromagnetic alloys, and combinations thereof. In some approaches, the optional soft magnetic underlayer may include a single layer structure or a multi-layer structure. For instance, one example of a multilayer soft magnetic underlayer structure may include a coupling layer (e.g., including Ru) sandwiched between one or more soft magnetic underlayers, where the coupling layer is configured to induce an anti-ferromagnetic coupling between one or more soft magnetic underlayers.

As also shown in FIG. 14, the magnetic recording medium 1400 includes the monolayer structure 1402 of self-assembled nanoparticles 1404 positioned above the substrate 1406. The self-assembled nanoparticles 1404 are coupled to a polymer and/or oligomer matrix 1408. In particular, each of the self-assembled nanoparticles 1404 includes a nanoparticle core 1410 grafted to one or more polymeric and/or oligomeric ligands 1412.

In various approaches, each of the self-assembled nanoparticles 1404 may include the same materials, arrangement/structure and/or properties as previously disclosed herein (e.g., as disclosed with reference to structures 101, 103, and 105 of FIG. 1). For example, the nanoparticles may each include one or more ligands having a first functional group configured to bind to their respective nanoparticle core and a second functional group configured to bind to the substrate 1402 (but not another nanoparticle core and/or ligand). However, in other approaches, the grafted nanoparticles may each include one or more ligands 21 having a first functional group configured to bind to their respective nanoparticle core but not a second functional group configured to bind to the substrate 1402.

Additionally, the monolayer structure 1402 of self-assembled nanoparticles 1404 may be formed by any of the methods disclosed herein (e.g., the methods described in FIGS. 1-8). In preferred approaches, the monolayer structure 1402 of self-assembled nanoparticles 1404 may be formed via directed self-assembly using topographic and/or chemical contrast guiding.

As further shown in FIG. 14, the monolayer structure 1402 of self-assembled nanoparticles 1404 includes a plurality of nucleation regions 1414 (i.e., the top/upper surfaces of the nanoparticle cores 1410) and a plurality of non-nucleation regions 1416. The non-nucleation regions 1416 are recessed relative to the nucleation regions 1414, thereby providing a topographic contrast in the monolayer structure 1402 of self-assembled nanoparticles 1404. In the embodiment shown in FIG. 14, the recessed non-nucleation regions 1416 may extend to the upper surface of the substrate 1406 such that the depth of the recessed non-nucleation regions 1416 is about equal to the thickness, $t_m$, of the monolayer structure 1402. It is important to note, however, that in other approaches, the depth of the recessed non-nucleation regions 1416 may be equal to or less than the thickness, t, of the monolayer structure 1402. In approaches where the depth of the recessed non-nucleation regions 1416 may be equal to or less than the thickness, $t_m$, of the monolayer structure 1402 (such that the non-nucleation regions 1416 extend above the substrate 1406 up to the thickness, $t_m$, of the monolayer structure 1402), the non-nucleation regions 1416 may include primarily the polymeric and/or oligomeric ligands 1412 grafted to the nanoparticles 1404. In yet more approaches, the depth of the recessed non-nucleation regions 1416 may be greater than the thickness, $t_m$, of the monolayer structure 1402 such that the non-nucleation regions 1416 extend into portions of the substrate 1406 and/or other intervening underlying layers.

In various approaches, the center-to-center spacing between the nanoparticle cores 1410 (and thus the nucleation regions 1414) may be in a range from about 2 to about 30 nm, preferably about 5 to 20 nm.

In further approaches, the assembly of nanoparticles 1404 in the monolayer structure 1402 may exhibit polycrystalline (multi-raft) ordering, single raft ordering, and/or single raft ordering with translation ordering.

In more approaches, one or more additional layers 1418 may be positioned above the monolayer structure 1402 of self-assembled nanoparticles 1404. Each of these additional layers 1418 may be non-magnetic or magnetic, crystalline or non-crystalline. As a result of the topographic and/or chemical contrast between the nucleation regions 1414 and the non-nucleation regions 1416, the growth of the one or more additional layers 1418 may be initiated relative to the nucleation regions 1414.

As shown in FIG. 14, at least one of these one or more additional layers 1418 may be a magnetic recording layer comprising a plurality of ferromagnetic grains. One or more magnetic grains may nucleate at each of the nucleation regions thereby resulting in columnar magnetic grain or island growth at the nucleation regions 1414. The magnetic recording layer material may include, but is not limited to, Cr, Fe, Ta, Ni, Mo, Pt, W, Cr, Ru, Ti, Si, O, V, Nb, Ge, B, Pd, and combinations thereof. The magnetic recording layer material may also include alloys comprising at least two of Co, Pt, Cr, Nb, and Ta, in some approaches. The magnetic recording layer may also be a multilayer film in more approaches, for example with Co and Pd or Pt being alternately layered. Regardless of how many magnetic recording layers are included in the magnetic recording layer, preferably all of the magnetic recording layers may have a similar magnetic grain pitch. The magnetic grain pitch may be due to the conformal growth of the lowermost magnetic recording layer that is transferred to the magnetic layers formed there above.

Individual magnetic grains and/or magnetic islands (e.g., comprised of a plurality of magnetic grains) in the magnetic recording layer may be separated by a segregant, which is preferably positioned above the non-nucleation regions 1416. The segregant may include oxides and/or nitrides of Ta, W, Nb, V, Mo, B, Si, Co, Cr, Ti, Al, etc., or C or Cr or any suitable non-magnetic segregant material known in the art.

In preferred approaches, the magnetic recording medium 1400 may be a perpendicular recording medium, thus the direction of magnetization of the magnetic recording layer will be in a direction substantially perpendicular to the recording layer surface. Moreover, the magnetic recording medium 1400 may be also be particularly useful as a patterned magnetic recording medium (e.g., bit patterned magnetic recording medium) given the registry between the nucleation regions 1414 and the magnetic grains in the magnetic recording layer.

The one or more additional layers 1418 may also include one or more optional capping layers above the magnetic recording layer, in some approaches. The one or more capping layers may be configured to mediate the intergranular coupling of the magnetic grains present in the magnetic recording layer. The optional one or more capping layers may include, for example, a Co—, CoCr—, CoPtCr—, and/or CoPtCrB— based alloy, or other material suitable for use in a capping layer as would be recognized by one having skill in the art upon reading the present disclosure.

The one or more additional layers 1418 may further include a protective overcoat layer positioned above the magnetic recording layer and/or the one or more capping layers if present. The protective overcoat layer may be configured to protect the underlying layers from wear, corrosion, etc. This protective overcoat layer may be made of, for example, diamond-like carbon, carbon nitride, Si-nitride, BN or B4C, etc. or other such materials suitable for a protective overcoat as would be understood by one having skill in the art upon reading the present disclosure.

In additional approaches, the one or more additional layers 1418 may include an optional lubricant layer positioned above the protective overcoat layer. The material of the lubricant layer may include, but is not limited to perfluoropolyether, fluorinated alcohol, fluorinated carboxylic acids, etc., or other suitable lubricant material as known in the art.

The formation of the magnetic recording medium 1400 of FIG. 14 may be achieved via known deposition and processing techniques. For instance, deposition one or more of the layers present in the magnetic recording medium 1400 may be achieved via DC magnetron sputtering, RF magnetron sputtering, molecular beam epitaxy, etc., or other such techniques as would be understood by one having skill in the art upon reading the present disclosure.

Figure 15:
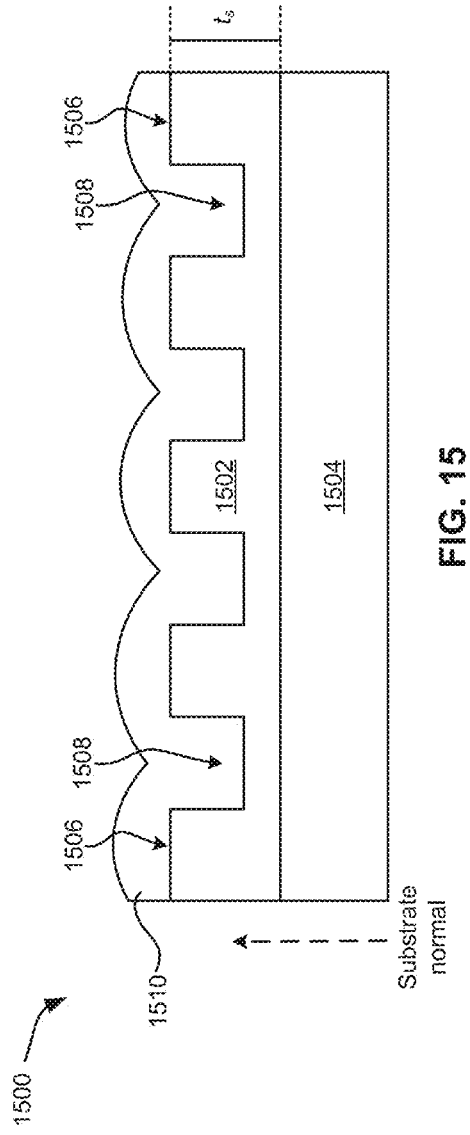
FIG. 15 is a simplified schematic of a magnetic recording medium comprising a seed layer, according to another embodiment.

Referring now to FIG. 15 a magnetic recording medium 1500 comprising a seed layer 1502 is shown, according to another embodiment. As an option, the magnetic recording medium 1500 may be implemented in conjunction with features from any other embodiment listed herein, such as those described with reference to the other FIGS. Of course, the magnetic recording medium 1500 and others presented herein may be used in various applications and/or in permutations which may or may not be specifically described in the illustrative embodiments listed herein. For instance, the magnetic recording medium 1500 may include more or less layers than those shown in FIG. 15, in various approaches. Furthermore, the magnetic medium 1500 and others presented herein may be used in any desired environment.

As shown in FIG. 15, the structure includes a non-magnetic substrate 1504, which may include glass, ceramic materials, glass/ceramic mixtures, AlMg, silicon, silicon-carbide, or other substrate material suitable for use in magnetic recording media as would be recognized by one having skill in the art upon reading the present disclosure.

In some approaches, the magnetic recording medium 1500 may include an optional adhesion layer (not shown in FIG. 15) above the substrate 1504 to promote coupling of layers formed thereabove. In other approaches, the magnetic recording medium 1500 may also include one or more optional soft magnetic underlayers (not shown in FIG. 15) positioned above the substrate 1504. The one or more optional soft magnetic underlayers may be configured to promote data recording in a magnetic recording layer positioned thereabove.

As shown in FIG. 15, the seed layer 1502 is positioned above the substrate 1504. In some approaches, the seed layer 1502 may include a material selected from a group consisting of: Pt, Pd, Au, Ru, RuAl, RuRh, NiW, MgO, Cr, TiN, and combinations thereof. In additional more approaches, the seed layer 1502 may have a crystallographic orientation substantially along the axis perpendicular to the upper surface of the substrate. The axis perpendicular to the supper surface of the substrate 1504 is represented by the dotted arrow shown FIG. 15, and may also be referred to as the substrate normal.

In particular approaches, the seed layer 1502 may have a crystallographic texture selected and/or configured to encourage the epitaxial growth and/or crystallographic texture of any additional layers deposited thereon. For instance, in one embodiment, the seed layer 1502 may include a predominantly (111) crystallographic texture, which may encourage the growth of additional NiAl(110), Ru(002), Pt(002) and/or CoCrPt(002) layers deposited thereon. In another embodiment, the seed layer 1502 may include a predominantly (002) crystallographic texture, which may encourage the growth of an additional FePt $L1_0$ (001) layer deposited thereon.

As further shown in FIG. 15, the seed layer 1502 includes a plurality of nucleation regions 1506 and a plurality of non-nucleation regions 1508. The non-nucleation regions 1508 are recessed relative to the nucleation regions 1506, thereby providing a topographic contrast in the seed layer 1502. In various approaches, the depth of the recessed non-nucleation regions 1508 may be about equal to or less than the thickness, $t_s$, of the seed layer 1502. In more approaches, the depth of the recessed non-nucleation regions 1508 may be greater than the thickness, $t_s$, of the seed layer 1502, such that the recessed non-nucleation regions may extend into the substrate 1504 and/or any intervening underlying layers.

In various approaches, the center-to-center spacing between the nucleation regions 1506 may be in a range from about 2 to about 30 nm, preferably about 5 to 20 nm.

In further approaches, the arrangement of nucleation regions 1506 may exhibit polycrystalline (multi-raft) ordering, single raft ordering, and/or single raft ordering with translation ordering.

In various approaches, there may be a chemical contrast, in addition to or instead of a topographic contrast, between the nucleation regions 1506 and the non-nucleation regions 1508. For instance, the nucleation regions 1506 may include a first material and the non-nucleation regions 1508 may include a second material, where the first and second materials have different surface free energies. In some approaches, the second material may include a nitride, an amorphous material, a metal, etc. provided that the second material has a different surface free energy than the first material. In various approaches, the thickness of the second material in the non-nucleation regions 1508 may be about equal to the thickness of the seed layer 1502, thus resulting in chemical contrast, but substantially no topographic contrast, between the nucleation regions 1506 and the non-nucleation regions 1508. In other approaches, there may only be topographic contrast between the nucleation regions 1506 and the non-nucleation regions 1508. However, in preferred approaches, there may be topographic contrast and chemical contrast between the nucleation regions 1506 and the non-nucleation regions 1508.

As also shown in FIG. 15, one or more additional layers 1510 may be positioned above the seed layer 1502. The additional layer(s) 1510 may include the materials, structure, arrangement, etc. as disclosed with reference to the additional layers 1418 of FIG. 14.

Figure 16:
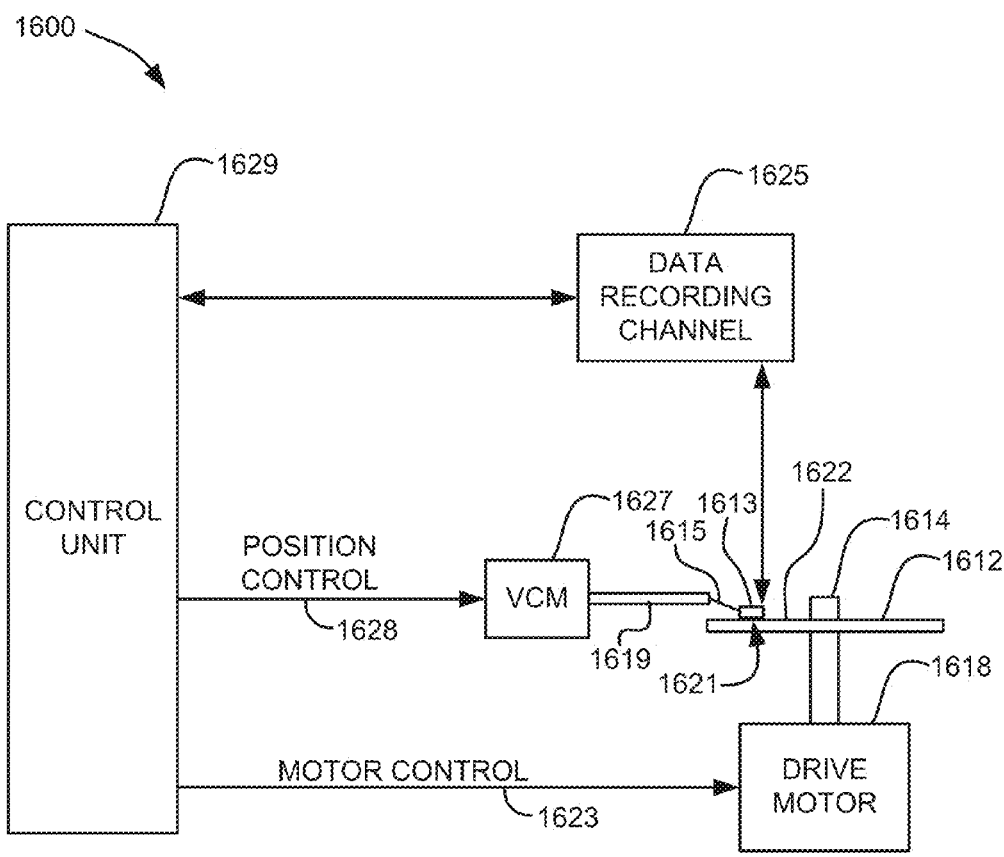
FIG. 16 is a simplified schematic of a magnetic recording disk drive system, according to one embodiment.

FIG. 16 shows one embodiment of a magnetic disk drive 1600 that may operate with a magnetic medium, such as the media 1400, 1500 of FIGS. 14-15. As shown in FIG. 16, at least one rotatable magnetic medium (e.g., magnetic disk) 1612 is supported on a spindle 1614 and rotated by a drive mechanism, which may include a disk drive motor 1618. The magnetic recording on each disk is typically in the form of an annular pattern of concentric data tracks (not shown) on the disk 1612. Thus, the disk drive motor 1618 preferably passes the magnetic disk 1612 over the magnetic read/write portions 1621, described immediately below.

At least one slider 1613 is positioned near the disk 1612, each slider 1613 supporting one or more magnetic read/write portions 1621, e.g., of a magnetic head according to any of the approaches described and/or suggested herein. As the disk rotates, slider 1613 is moved radially in and out over disk surface 1622 so that portions 1621 may access different tracks of the disk where desired data are recorded and/or to be written. Each slider 1613 is attached to an actuator arm 1619 by means of a suspension 1615. The suspension 1615 provides a slight spring force which biases slider 1613 against the disk surface 1622. Each actuator arm 1619 is attached to an actuator 1627. The actuator 1627 as shown in FIG. 16 may be a voice coil motor (VCM). The VCM comprises a coil movable within a fixed magnetic field, the direction and speed of the coil movements being controlled by the motor current signals supplied by controller 1629.

During operation of the disk storage system, the rotation of disk 1612 generates an air bearing between slider 1613 and disk surface 1622 which exerts an upward force or lift on the slider. The air bearing thus counter-balances the slight spring force of suspension 1615 and supports slider 1613 off and slightly above the disk surface by a small, substantially constant spacing during normal operation. Note that in some embodiments, the slider 1613 may slide along the disk surface 1622.

The various components of the disk storage system are controlled in operation by control signals generated by controller 1629, such as access control signals and internal clock signals. Typically, control unit 1629 comprises logic control circuits, storage (e.g., memory), and a microprocessor. In a preferred approach, the control unit 1629 is electrically coupled (e.g., via wire, cable, line, etc.) to the one or more magnetic read/write portions 1621, for controlling operation thereof. The control unit 1629 generates control signals to control various system operations such as drive motor control signals on line 1623 and head position and seek control signals on line 1628. The control signals on line 1628 provide the desired current profiles to optimally move and position slider 1613 to the desired data track on disk 1612. Read and write signals are communicated to and from read/write portions 1621 by way of recording channel 1625.

The above description of a typical magnetic disk storage system, and the accompanying illustration of FIG. 16 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write portion includes a coil layer embedded in one or more insulation layers (insulation stack), the insulation stack being located between first and second pole piece layers. A gap is formed between the first and second pole piece layers of the write portion by a gap layer at or near a media facing side of the head (sometimes referred to as an ABS in a disk drive). The pole piece layers may be connected at a back gap. Currents are conducted through the coil layer, which produce magnetic fields in the pole pieces. The magnetic fields fringe across the gap at the media facing side for the purpose of writing bits of magnetic field information in tracks on moving media, such as in circular tracks on a rotating magnetic disk.

The second pole piece layer has a pole tip portion which extends from the media facing side to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

It is important to note that the structures disclosed herein are not limited to magnetic recording media. Rather the structures disclosed herein, which may have seed layers with purposefully located nucleation regions and/or preferred crystallographic orientations may also be useful in microelectronic devices, semiconductor electronics, optoelectronics, solar cells, sensors, memories, capacitors, detectors, recording media, etc.

It should also be noted that methodology presented herein for at least some of the various embodiments may be implemented, in whole or in part, in computer hardware, software, by hand, using specialty equipment, etc. and combinations thereof. Moreover, any of the structures and/or steps may be implemented using known materials and/or techniques, as would become apparent to one skilled in the art upon reading the present specification.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A structure comprising a substrate and a monolayer of nanoparticles positioned above the substrate;
    wherein the nanoparticles each bind to one or more functionalized ligands, wherein the functionalized ligands comprise oligomers and/or polymers,
        wherein each of the oligomers and/or polymers has a first functional group and a second functional group and are selected from the group consisting of polystyrene, polymethyl methacrylate, polyvinyl pyridine, polyferrocenyldimethylsilane, polyethylene oxide, polylactic acid, polytrimethylsilylstyrene, polyisoprene, polybutadiene, and combinations of two or more thereof;
            wherein the first functional group binds to the nanoparticle by a covalent bond, an ionic bond, a hydrogen bond, van der Waals forces, dispersion forces, dipole-dipole interactions, or combinations thereof, and
            the second functional group binds to the substrate by a covalent bond, an ionic bond, a hydrogen bond, van der Waals forces, dispersion forces, dipole-dipole interactions, or combinations thereof and is independently selected from a group consisting of a hydroxyl, a carboxyl, and an amine.

2. The structure as recited in claim 1, wherein each of the nanoparticles independently comprises a material selected from a group consisting of: a metal, a dielectric, and a semiconductor.

3. The structure as recited in claim 1, wherein each of the nanoparticles has a diameter in a range between about 1 nm to about 15 nm, wherein a pitch between adjacent nanoparticles is in a range between about 5 to about 20 nm.

4. The structure as recited in claim 1, wherein each of the polymers and/or oligomers has an average molecular weight between about 0.5 kDa to about 10 kDa.

5. The structure as recited in claim 1, wherein the second functional group of each of the polymers and/or oligomers binds to the substrate by a covalent bond, an ionic bond, a hydrogen bond, or combinations thereof.

6. The structure as recited in claim 1, wherein the monolayer of the nanoparticles positioned above the substrate has a nanoparticle surface coverage between about 80% to about 120%.

7. The structure as recited in claim 1, wherein the substrate includes topographic and/or chemical contrast guiding features.

8. The structure as recited in claim 1, wherein the monolayer of nanoparticles includes a plurality of recessed regions and a plurality of non-recessed regions.

9. The structure as recited in claim 8, wherein a depth of the recessed regions is greater than a thickness of the monolayer of nanoparticles.

10. The structure as recited in claim 8, wherein a depth of the recessed regions is about equal to or less than a thickness of the monolayer of nanoparticles.

11. The structure as recited in claim 8, wherein the plurality of non-recessed regions include nucleation regions, and wherein the plurality of recessed regions include non-nucleation regions.

12. The structure as recited in claim 8, wherein the plurality of non-recessed regions include non-nucleation regions, and wherein the plurality of recessed regions include nucleation regions.

13. The structure as recited in claim 8, further comprising one or more crystalline layers positioned above the monolayer of nanoparticles.

14. The structure as recited in claim 13, wherein at least one of the one or more crystalline layers is a granular magnetic recording layer.

15. The structure as recited in claim 1, wherein the monolayer of the nanoparticles is configured for use as an etch mask for pattern transfer into the substrate, wherein the substrate includes at least one of a metal, a dielectric material, and a semiconductor material.

16. A magnetic data storage system, comprising:
    at least one magnetic head,
    the structure as recited in claim 1;
    a drive mechanism for passing the structure over the at least one magnetic head; and
    a controller electrically coupled to the at least one magnetic head for controlling operation of the at least one magnetic head.

17. A structure comprising a monolayer of nanoparticles positioned above a substrate, the substrate comprising a chemical contrast guiding pattern;
  wherein the nanoparticles each bind to one or more functionalized ligands, wherein the functionalized ligands comprise oligomers and/or polymers,
    wherein each of the oligomers and/or polymers has a first functional group and a second functional group and are selected from the group consisting of polystyrene, polymethyl methacrylate, polyvinyl pyridine, polyferrocenyldimethylsilane, polyethylene oxide, polylactic acid, polytrimethylsilylstyrene, polyisoprene, polybutadiene, and combinations of two or more thereof;
      wherein the first functional group binds to the nanoparticle by a covalent bond, an ionic bond, a hydrogen bond, van der Waals forces, dispersion forces, dipole-dipole interactions, or combinations thereof, and
      the second functional group binds to the chemical contrast guiding pattern by a covalent bond, an ionic bond, a hydrogen bond, van der Waals forces, dispersion forces, dipole-dipole interactions, or combinations thereof and is independently selected from a group consisting of a hydroxyl, a carboxyl, and an amine.

18. The structure as recited in claim 17, wherein each of the nanoparticles has a diameter in a range between about 1 nm to about 15 nm, wherein a pitch between adjacent nanoparticles is in a range between about 5 to about 20 nm.

19. The structure as recited in claim 17, wherein each of the polymers and/or oligomers has an average molecular weight between about 0.5 kDa to about 10 kDa.

20. The structure as recited in claim 17, wherein the second functional group binds to the substrate by a covalent bond, an ionic bond, a hydrogen bond, or combinations thereof.

21. The structure as recited in claim 17, further comprising one or more crystalline layers positioned above the monolayer of nanoparticles.

22. The structure as recited in claim 21, wherein at least one of the one or more crystalline layers is a granular magnetic recording layer.

23. The structure as recited in claim 17, wherein the substrate further includes topographic guiding features.

24. The structure as recited in claim 1, wherein each of the oligomers and/or polymers are selected from the group consisting of polystyrene, polymethyl methacrylate, polyvinyl pyridine, polyethylene oxide, polylactic acid, polytrimethylsilylstyrene, polyisoprene, polybutadiene, and combinations of two or more thereof.

25. The structure as recited in claim 17, wherein each of the oligomers and/or polymers are selected from the group consisting of polystyrene, polymethyl methacrylate, polyvinyl pyridine, polyethylene oxide, polylactic acid, polytrimethylsilylstyrene, polyisoprene, polybutadiene, and combinations of two or more thereof.

* * * * *